US009501218B2

(12) United States Patent
Hwang et al.

(10) Patent No.: US 9,501,218 B2
(45) Date of Patent: Nov. 22, 2016

(54) INCREASING TOUCH AND/OR HOVER ACCURACY ON A TOUCH-ENABLED DEVICE

(71) Applicant: Microsoft Technology Licensing, LLC, Redmond, WA (US)

(72) Inventors: Daniel J. Hwang, Renton, WA (US); Juan (Lynn) Dai, Sammamish, WA (US); Sharath Viswanathan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 14/152,838

(22) Filed: Jan. 10, 2014

(65) Prior Publication Data

US 2015/0199101 A1    Jul. 16, 2015

(51) Int. Cl.
*G06F 3/041*    (2006.01)
*G06F 3/0488*    (2013.01)

(52) U.S. Cl.
CPC ... *G06F 3/0488* (2013.01); *G06F 2203/04101* (2013.01)

(58) Field of Classification Search
CPC ..................................... G06F 3/0488
USPC ........................................... 345/173
See application file for complete search history.

(56) References Cited

U.S. PATENT DOCUMENTS

| 7,877,707 | B2 | 1/2011 | Westerman et al. |
| 8,255,836 | B1 | 8/2012 | Gildfind |
| 8,347,221 | B2 | 1/2013 | Griffin et al. |
| 2008/0192024 | A1* | 8/2008 | Mita ................ G06F 3/044 345/173 |
| 2009/0122007 | A1 | 5/2009 | Tsuzaki et al. |
| 2010/0097331 | A1 | 4/2010 | Wu |
| 2011/0007021 | A1 | 1/2011 | Bernstein et al. |
| 2012/0050180 | A1* | 3/2012 | King ................ G06F 3/0416 345/173 |
| 2012/0120002 | A1 | 5/2012 | Ota |
| 2012/0262420 | A1 | 10/2012 | Sobel et al. |
| 2013/0050131 | A1 | 2/2013 | Lee et al. |

(Continued)

FOREIGN PATENT DOCUMENTS

EP    2196891 A2    6/2010

OTHER PUBLICATIONS

"Second Written Opinion Issued in PCT Application No. PCT/US2015/010206", Mailed Date: Nov. 18, 2015, 8 Pages.

(Continued)

*Primary Examiner* — Jason Olson
(74) *Attorney, Agent, or Firm* — Judy Yee; Micky Minhas

(57) ABSTRACT

Techniques are described herein that are capable of increasing touch and/or hover accuracy on a touch-enabled device. For example, attribute(s) of a hand or a portion thereof (e.g., one or more fingers) may be used to determine a location on a touch screen to which a user intends to point. Such attribute(s) may be derived, measured, etc. For instance, a value corresponding to a distance between the hand/portion and the touch screen may be derived from a magnitude of a measurement of an interaction between the hand/portion and the touch screen. In another example, virtual elements displayed on the touch screen may be mapped to respective areas in a plane that is parallel (e.g., coincident) with the touch screen. In accordance with this example, receiving a touch and/or hover command with regard to an area in the plane may indicate selection of the corresponding virtual element.

20 Claims, 13 Drawing Sheets

(56) References Cited

U.S. PATENT DOCUMENTS

| | | | | |
|---|---|---|---|---|
| 2014/0028557 | A1* | 1/2014 | Otake | G09G 5/00 |
| | | | | 345/158 |
| 2014/0191998 | A1* | 7/2014 | Chuang | G06F 3/017 |
| | | | | 345/173 |
| 2015/0277760 | A1* | 10/2015 | Tagaya | G06F 3/0488 |
| | | | | 715/711 |

OTHER PUBLICATIONS

"International Search Report and Written Opinion Issued in PCT Patent Application No. PCT/US2015/010206", Mailed Date: Mar. 18, 2015, 12 Pages.

Crook, Jordan, "Samsung Galaxy S 4 Beats the Best With 5-inch, 1080p Display, 1.9GHz Processor, Gesture Controls and A Q2 2013 Release", Published on: Mar. 14, 2013, Available at: http://techcrunch.com/2013/03/14/ samsung-galaxy-s-4-beats-the-best-with-5-inch-1080p-display-1-9ghz-processor-gesture-controls-and-a-q2-2012-release/, 7 pages.

Chen, et al., "uTouch: Sensing Touch Gestures on Unmodified LCDs", In Proceedings of the SIGCHI Conference on Human Factors in Computing Systems, Apr. 27, 2013, 4 pages.

"International Preliminary Report on Patentability Issued in PCT Application No. PCT/US2015/010206", Mailed Date : Apr. 5, 2016, 9 Pages.

* cited by examiner

INCREASING TOUCH AND/OR HOVER ACCURACY ON A TOUCH-ENABLED DEVICE

BACKGROUND

Touch screens have had enormous growth in recent years. Touch screens are now common in places such as kiosks at airports, automatic teller machines (ATMs), vending machines, computers, mobile phones, etc.

A touch screen typically provides a user with a variety of options through icons, and the user can select those icons to launch an application, to control an application, to obtain additional information associated with the icons, etc. For instance, the user may tap (i.e., physically touch) an icon on the touch screen to select the icon. Some touch screens are configured to support hover functionality, which enables a user to select an icon without physically touching the touch screen. For example, the user may place a finger above the icon to select the icon without tapping the touch screen.

However, any of a variety of conditions may negatively affect the accuracy of a user's touch and/or hover commands for selecting icons on the touch screen. For example, the manner in which the user holds the touch-enabled device may interfere with the user's ability to reach certain icons. In another example, the user's hand may be in motion while the user is attempting to select an icon with that hand. Under such conditions, the user may accidentally select no icon or an icon other than the intended icon.

SUMMARY

Various approaches are described herein for, among other things, increasing touch and/or hover accuracy on a touch-enabled device. For example, attribute(s) of a hand or a portion thereof (e.g., one or more fingers) may be used to determine a location on a touch screen to which the user intends to point. In accordance with this example, the attribute(s) may be used to determine a virtual element (e.g., icon) displayed on the touch screen that is intended to be selected. Examples of such attribute(s) include but are not limited to a location of the hand (or portion thereof) in a plane that is parallel with the touch screen, a distance between the hand (or portion thereof) and the touch screen, and an angle of the hand (or portion thereof) with respect to an axis that is perpendicular to the touch screen. Such attribute(s) may be derived, measured, etc. For instance, a value corresponding to the distance between the hand (or portion thereof) and the touch screen may be derived from a magnitude of a measurement of an interaction (e.g., electrical, magnetic, or light-based interaction) between the hand (or portion thereof) and the touch screen.

In another example, virtual elements that are displayed on the touch screen may be mapped to respective areas in a plane that is parallel (e.g., coincident) with the touch screen. In accordance with this example, receiving a touch and/or hover command with regard to an area in the plane may indicate selection of the corresponding virtual element. The size, shape, location, etc. of each area and its corresponding virtual element may be the same or different.

A hover command may include a hover gesture. A hover gesture can occur without a user physically touching a touch screen of a touch-enabled device. Instead, the user's hand or portion thereof (e.g., one or more fingers) can be positioned at a spaced distance above the touch screen. The touch screen can detect that the user's hand (or portion thereof) is proximate to the touch screen, such as through capacitive sensing. Additionally, hand movement and/or finger movement can be detected while the hand and/or finger(s) are hovering to expand the existing options for gesture input.

Example methods are described. In accordance with a first example method, finger(s) in a hover position are determined. The finger(s) are a spaced distance from a touch screen. A first location of the finger(s) in a plane that is parallel with the touch screen is determined. A distance between the finger(s) and the touch screen is determined. The distance is along an axis that is perpendicular to the touch screen. An angle of the finger(s) with respect to the axis is determined. A second location on the touch screen to which the finger(s) point is determined based on the first location, the distance, and the angle.

In accordance with a second example method, a mapping of virtual elements that are displayed on a touch screen to respective areas in a plane that is parallel with the touch screen is performed. Each area is configured to receive input for selection of the virtual element that is mapped to the area. Finger(s) in a hover position are determined. The finger(s) are a spaced distance from the touch screen. First attribute(s) of one or more areas in the plane are changed to change the mapping between the one or more areas and one or more respective virtual elements that are mapped to the one or more respective areas, based on one or more second attributes of the finger(s), in response to determining the finger(s) in the hover position.

In accordance with a third example method, a hover gesture is detected with regard to a virtual element on a touch screen based on a designated interaction between at least a portion of a hand and the touch screen. The designated interaction is an electrical interaction, a magnetic interaction, and/or a light-based interaction. A value corresponding to a distance between the hand and the touch screen is derived from a magnitude of a measurement of the designated interaction. The hover gesture is a user command to perform an action associated with the virtual element. The hover gesture occurs without the hand touching the touch screen. The action is performed based on the hover gesture.

Example systems are also described. A first example system includes hover determination logic, location determination logic, distance determination logic, angle determination logic, and point determination logic. The hover determination logic is configured to determine finger(s) in a hover position. The finger(s) are a spaced distance from a touch screen. The location determination logic is configured to determine a first location of the finger(s) in a plane that is parallel with the touch screen. The distance determination logic is configured to determine a distance between the finger(s) and the touch screen. The distance is along an axis that is perpendicular to the touch screen. The angle determination logic is configured to determine an angle of the finger(s) with respect to the axis. The point determination logic is configured to determine a second location on the touch screen to which the finger(s) point based on the first location, the distance, and the angle.

A second example system includes mapping logic, hover determination logic, and attribute changing logic. The mapping logic is configured to perform a mapping of virtual elements that are displayed on a touch screen to respective areas in a plane that is parallel with the touch screen. Each area is configured to receive input for selection of the virtual element that is mapped to the area. The hover determination logic is configured to determine finger(s) in a hover position. The finger(s) are a spaced distance from the touch screen. The attribute changing logic is configured to change first attribute(s) of one or more areas in the plane to change the mapping between the one or more areas and one or more respective virtual elements that are mapped to the one or more respective areas, based on one or more second attributes of the finger(s), in response to the finger(s) in the hover position being determined.

A third example system includes hover detection logic and action logic. The hover detection logic is configured to detect a hover gesture with regard to a virtual element on a touch screen based on a designated interaction between at least a portion of a hand and the touch screen. The designated interaction is an electrical interaction, a magnetic interaction, and/or a light-based interaction. A value corresponding to a distance between the hand and the touch screen is derived from a magnitude of a measurement of the designated interaction. The hover gesture is a user command to perform an action associated with the virtual element. The hover gesture occurs without the hand touching the touch screen. The action logic is configured to perform the action based on the hover gesture.

Computer program products are also described. A first example computer program product includes a computer-readable medium having computer program logic recorded thereon for enabling a processor-based system to increase touch and/or hover accuracy on a touch-enabled device. The computer program product includes a first program logic module, a second program logic module, a third program logic module, a fourth program logic module, and a fifth program logic module. The first program logic module is for enabling the processor-based system to determine finger(s) in a hover position. The finger(s) are a spaced distance from a touch screen. The second program logic module is for enabling the processor-based system to determine a first location of the finger(s) in a plane that is parallel with the touch screen. The third program logic module is for enabling the processor-based system to determine a distance between the finger(s) and the touch screen. The distance is along an axis that is perpendicular to the touch screen. The fourth program logic module is for enabling the processor-based system to determine an angle of the finger(s) with respect to the axis. The fifth program logic module is for enabling the processor-based system to determine a second location on the touch screen to which the finger(s) point based on the first location, the distance, and the angle.

A second example computer program product includes a computer-readable medium having computer program logic recorded thereon for enabling a processor-based system to increase touch and/or hover accuracy on a touch-enabled device. The computer program product includes a first program logic module, a second program logic module, and a third program logic module. The first program logic module is for enabling the processor-based system to perform a mapping of virtual elements that are displayed on a touch screen to respective areas in a plane that is parallel with the touch screen. Each area is configured to receive input for selection of the virtual element that is mapped to the area. The second program logic module is for enabling the processor-based system to determine finger(s) in a hover position. The finger(s) are a spaced distance from the touch screen. The third program logic module is for enabling the processor-based system to change first attribute(s) of one or more areas in the plane to change the mapping between the one or more areas and one or more respective virtual elements that are mapped to the one or more respective areas, based on one or more second attributes of the finger(s), in response to the finger(s) in the hover position being determined.

A third example computer program product includes a computer-readable medium having computer program logic recorded thereon for enabling a processor-based system to perform an action based on a hover gesture. The computer program product includes a first program logic module and a second program logic module. The first program logic module is for enabling the processor-based system to detect a hover gesture with regard to a virtual element on a touch screen based on a designated interaction between at least a portion of a hand and the touch screen. The designated interaction is an electrical interaction, a magnetic interaction, and/or a light-based interaction. A value corresponding to a distance between the hand and the touch screen is derived from a magnitude of a measurement of the designated interaction. The hover gesture is a user command to perform an action associated with the virtual element. The hover gesture occurs without the hand touching the touch screen. The second program logic module is for enabling the processor-based system to perform the action based on the hover gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 1, 5, 7, and 11 are block diagrams of example touch-enabled devices in accordance with embodiments.

Figure 1:
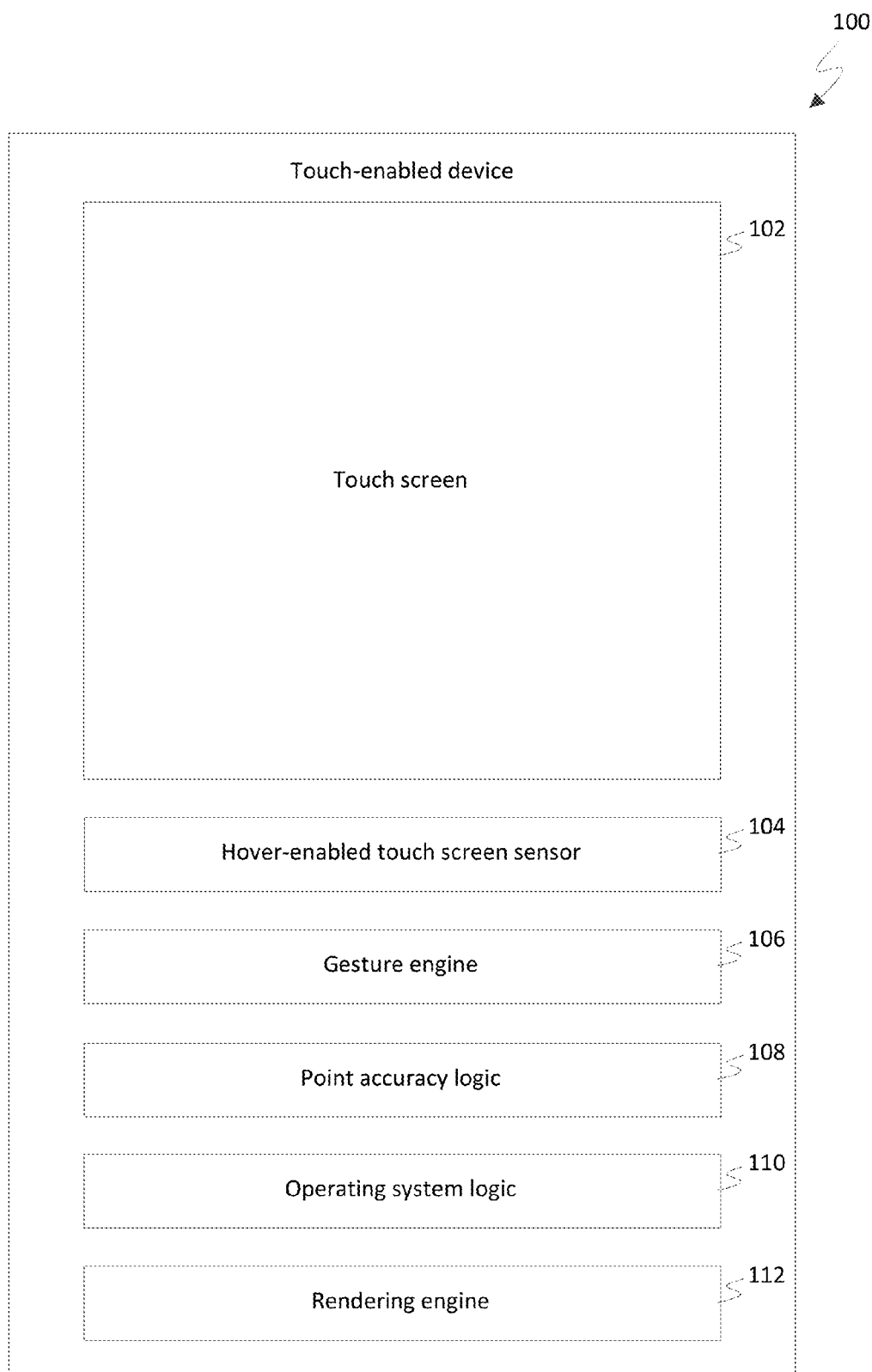

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of increasing touch and/or hover accuracy on a touch-enabled device. For instance, the touch-enabled device may include a touch screen that includes a touch-responsive surface. The touch-responsive surface may include any of a variety of materials that are responsive to resistance, capacitance, and/or light to detect a touch or hover command (e.g., a touch gesture, a hover gesture, or finger(s) in a hover position). A touch or hover command may be detected and an action performed in response to the detection. The example embodiments may increase a likelihood that the detected touch or hover command is the same as the touch or hover command intended by the user.

A hover command may include a hover gesture. A hover gesture can occur without a user physically touching a touch screen of a touch-enabled device. Instead, the user's hand or portion thereof (e.g., one or more fingers) can be positioned at a spaced distance above the touch screen. The touch screen can detect that the user's hand (or portion thereof) is proximate to the touch screen, such as through capacitive sensing. Additionally, hand movement and/or finger movement can be detected while the hand and/or finger(s) are hovering to expand the existing options for gesture input In accordance with one example embodiment, attribute(s) of a hand or a portion thereof (e.g., one or more fingers) are used to determine a location on a touch screen to which the user intends to point. For instance, the attribute(s) may be used to determine a virtual element displayed on the touch screen that is intended to be selected. Examples of such attribute(s) include but are not limited to a location of the hand (or portion thereof) in a plane that is parallel with the touch screen, a distance between the hand (or portion thereof) and the touch screen, and an angle of the hand (or portion thereof) with respect to an axis that is perpendicular to the touch screen. Such attribute(s) may be derived, measured, etc. For example, a value corresponding to the distance between the hand (or portion thereof) and the touch screen may be derived from a magnitude of a measurement of an interaction (e.g., electrical, magnetic, or light-based interaction) between the hand (or portion thereof) and the touch screen.

Examples of a virtual element include but are not limited to a window; an icon; a virtual button; a photograph; a drawing; a textual document, such as a word processing document or a message (e.g., an email, a short message service (SMS), an instant message (IM), etc.); a control interface (or a control therein) configured to control content (e.g., content associated with another virtual element); a soft input panel (SIP) (e.g., a virtual keyboard) or virtual key therein; and a representation of an item, such as a map (or point of interest thereon), a song, a movie, or a computer program (e.g., a graphics editing program, a word processing program, an email program, a map program, a media player, an Internet browser, etc.). A virtual element may be associated with content, though the scope of the example embodiments is not limited in this respect. For instance, the content may be displayed in the virtual element. Examples of content include but are not limited to media content (e.g., audio, video, photograph(s), or a combination thereof), audio/visual content (e.g., video with sound), audio content, visual content, etc. Visual content may include non-textual content (e.g., map, photograph, video without sound) and/or textual content.

In accordance with another example embodiment, virtual elements that are displayed on the touch screen may be mapped to respective areas in a plane that is parallel (e.g., coincident) with the touch screen. For instance, receiving a touch and/or hover command with regard to an area in the plane may indicate selection of the corresponding virtual element. The size, shape, location, etc. of each area and its corresponding virtual element may be the same or different.

Example techniques described herein have a variety of benefits as compared to conventional techniques for receiving user input on a touch screen. For instance, the example techniques may be capable of more accurately determining a touch or hover command that is intended by a user, as compared to conventional techniques. Accordingly, the example techniques may be capable of more accurately determining to which of a plurality of virtual elements the user points. The techniques may compensate for physical shortcomings of the user (e.g., the user's inability to reach some virtual elements that are displayed on the touch screen, for example, due to a manner in which the user is holding the touch-enabled device). The example techniques may enable the user to select a virtual element that is displayed on the touch screen without the user's finger(s) covering the virtual element. For instance, the virtual element may remain visible to the user while the user selects the virtual element. A hover command that is received from the user may include a hover gesture. Such hover gesture need not necessarily be as precise as some other types of gestures (e.g., touch gestures) in order for accurate detection thereof to occur.

Embodiments described herein focus on a mobile device, such as a mobile phone. However, the described embodiments can be applied to any device with a touch screen or a touch surface, including laptop computers, tablets, desktop computers, televisions, wearable devices, etc.

Embodiments are described with respect to hover touch gestures (a.k.a. hover gestures) for illustrative purposes and are not intended to be limiting. It will be recognized that the embodiments described herein may be implemented using any suitable type of touch or user command. Such touch or hover command need not necessarily include a hover touch gesture.

FIG. 1 is a block diagram of an example touch-enabled device 100 in accordance with an embodiment. Generally speaking, touch-enabled device 100 operates to perform actions in response to touch and/or hover commands. In accordance with example embodiments described herein, touch-enabled device 100 is configured to more accurately determine touch and/or hover commands that are intended by users, as compared to conventional touch-enabled devices. Detail regarding techniques for increasing touch and/or hover accuracy on a touch-enabled device is provided in the following discussion.

As shown in FIG. 1, touch-enabled device 100 includes a touch screen 102, a hover-enabled touch screen sensor 104, a gesture engine 106, point accuracy logic 108, operating system (OS) logic 110, and a rendering engine 112. Touch screen 102 is a visual display that is configured to provide visual images in response to operations performed by rendering engine 112. Touch screen 102 enables users to interact with virtual elements that are displayed on touch screen 102 through touch and/or hover commands.

Hover-enabled touch screen sensor 104 is configured to detect touch commands and/or hover commands that are received from a user with respect to touch screen 102. For instance, hover-enabled touch screen sensor 104 is capable of detecting a touch gesture, a hover gesture, finger(s) in a hover position at a spaced distance (i.e., a non-zero distance) above touch screen 102, etc. Hover-enabled touch screen sensor 104 is further configured to generate a sensor signal based on detected touch command(s) and/or hover command(s).

A hover command is a user-input command in which the user's hand or portion thereof (e.g., one or more fingers, palm, etc.) is a spaced distance from the touch screen (e.g., touch screen 102), meaning that the user's hand or portion thereof is not in contact with the touch screen. Moreover, the user's hand should be within a relatively close range to the touch screen, such as between 0.1 inches to 0.25 inches, or between 0.25 inches and 0.5 inches, or between 0.5 inches and 0.75 inches or between 0.75 inches and 1 inch, or between 1 inch and 1.5 inches, etc. Any desired distance may be used, though in some embodiments, it may be desirable for the distance to be less than 2 inches. Accordingly any of a variety of ranges may be used. The sensing of a user's hand can be based on capacitive sensing, but other techniques can be used, such as ultrasonic distance sensing or camera-based sensing (e.g., images taken of the user's hand to determine distance and movement).

Some examples of hover-enabled touch screen sensor technology are available from Cypress Semiconductor Corporation, though other systems that provide similar hover-enabled touch screen sensor functionality are known in the art. Hover-enabled touch screen sensor 104 is shown to be separate from touch screen for illustrative purposes and is not intended to be limiting. For instance, it will be recognized that hover-enabled touch screen sensor 104 may be incorporated in touch screen 102.

Gesture engine 106 is configured to process sensor signals received from hover-enabled touch screen sensor 104 to interpret the touch and/or hover commands upon which the sensor signals are based. A hover command may include a hover gesture (i.e., a user input command to perform an action). A hover gesture can include a user finger remaining in a fixed position for a predetermined period of time or some predetermined finger movement. Some predetermined finger movements can include a tickle movement, wherein the user moves his/her fingertip back and forth in a rapid motion to mimic tickling, or a circle movement, or a check movement (like a user is checking a box), etc. Specific hover gestures include, but are not limited to (1) finger hover pan—float a finger above the screen and pan the finger in any direction or in a specified (e.g., predetermined) direction with respect to the screen; (2) finger hover tickle/flick—float a finger above the screen and quickly flick the finger once or multiple times as like a tickling motion with the finger; (3) high velocity flick—float a finger above the screen and flick the finger at a velocity that is greater than or equal to a threshold velocity; (4) finger hover circle—float a finger or thumb above the screen and draw a clockwise circle or a counter-clockwise circle in the air; (5) finger hover hold—float a finger above the screen and keep the finger stationary for at least a predetermined period of time; (6) palm swipe—float the edge of the hand or the palm of the hand and swipe across the screen; (7) air pinch/lift/drop—use the thumb and pointing finger to perform a pinch gesture above the screen, drag, then a release motion; (8) hand wave gesture—float a hand above the screen and move the hand back and forth in a hand-waving motion; (9) check mark—float a finger above the screen and trace out a check mark in the air; (10) squeeze—float a hand above the screen and move the fingers together in the air; (11) release—float a hand above the screen and move the fingers apart in the air. With each of these hover gestures, the user's fingers do not touch the screen. Gesture engine 106 is further configured to generate command signals, which indicate the touch and/or hover commands upon which the sensor signals are based.

Point accuracy logic 108 is configured to increase touch and/or hover accuracy of touch-enabled device 100. For example, point accuracy logic 108 may increase accuracy with which gesture engine 106 interprets touch and/or hover commands. In an aspect, point accuracy logic 108 may process (e.g., modify) sensor signals that are received from hover-enabled touch screen sensor 104 before passing them along to gesture engine 106. In another aspect, point accuracy logic 108 may provide accuracy signals to gesture engine 106 so that gesture engine 106 may use the accuracy signals in combination with the sensor signals to interpret the touch and/or hover commands. In one example embodiment, point accuracy logic 106 determines one or more attributes (e.g., location, distance, and/or angle) of a hand or a portion thereof (e.g., one or more fingers) with respect to touch screen 102 to determine a location on touch screen 102 to which the user intends to point. In another example embodiment, point accuracy logic 108 maps virtual elements that are displayed on touch screen 102 to respective areas in a plane that is parallel (e.g., coincident) with the touch screen and then determines a virtual element that is intended to be selected by the user based on a touch and/or hover command indicating the corresponding area in the plane. Some techniques for increasing touch and/or hover accuracy of a touch-enabled device are discussed in greater detail below with reference to FIGS. 2-15.

It will be recognized that point accuracy logic 108 or any portion thereof may be incorporated in hover-enabled touch screen sensor 104, gesture engine 106, and/or OS logic 110, though the scope of the example embodiments is not limited in this respect. It will be further recognized that hover-enabled touch screen sensor 104 (or any portion thereof) and/or gesture engine 106 (or any portion thereof) may be incorporated in point accuracy logic 108, though the scope of the example embodiments is not limited in this respect.

OS logic 110 executes an operating system. The operating system performs operations which may include but are not limited to managing hardware resources, providing services for execution of software programs, etc. on touch-enabled device 100. For instance, the operating system may cause action(s) to be performed based on the command signals that are received from gesture engine 106. For instance, the operating system may provide instructions to rendering engine 112 to indicate images that are to be displayed on touch screen 102. Examples of an operating system include but are not limited to Android® developed and distributed by Google Inc., Blackberry 10™ developed and distributed by Research in Motion Ltd., iOS™ developed and distributed by Apple Inc., Windows Phone® developed and distributed by Microsoft Corporation, and Firefox® OS developed and distributed by Mozilla Foundation Corporation.

Rendering engine 112 is configured to provide images for display on touch screen 102 based on instructions that are received from OS logic 110.

It will be recognized that touch-enabled device 100 may be implemented as a processing system. An example of a processing system is a system that includes at least one processor that is capable of manipulating data in accordance with a set of instructions. For instance, a processing system may be a computer, a personal digital assistant, etc.

Figure 2:
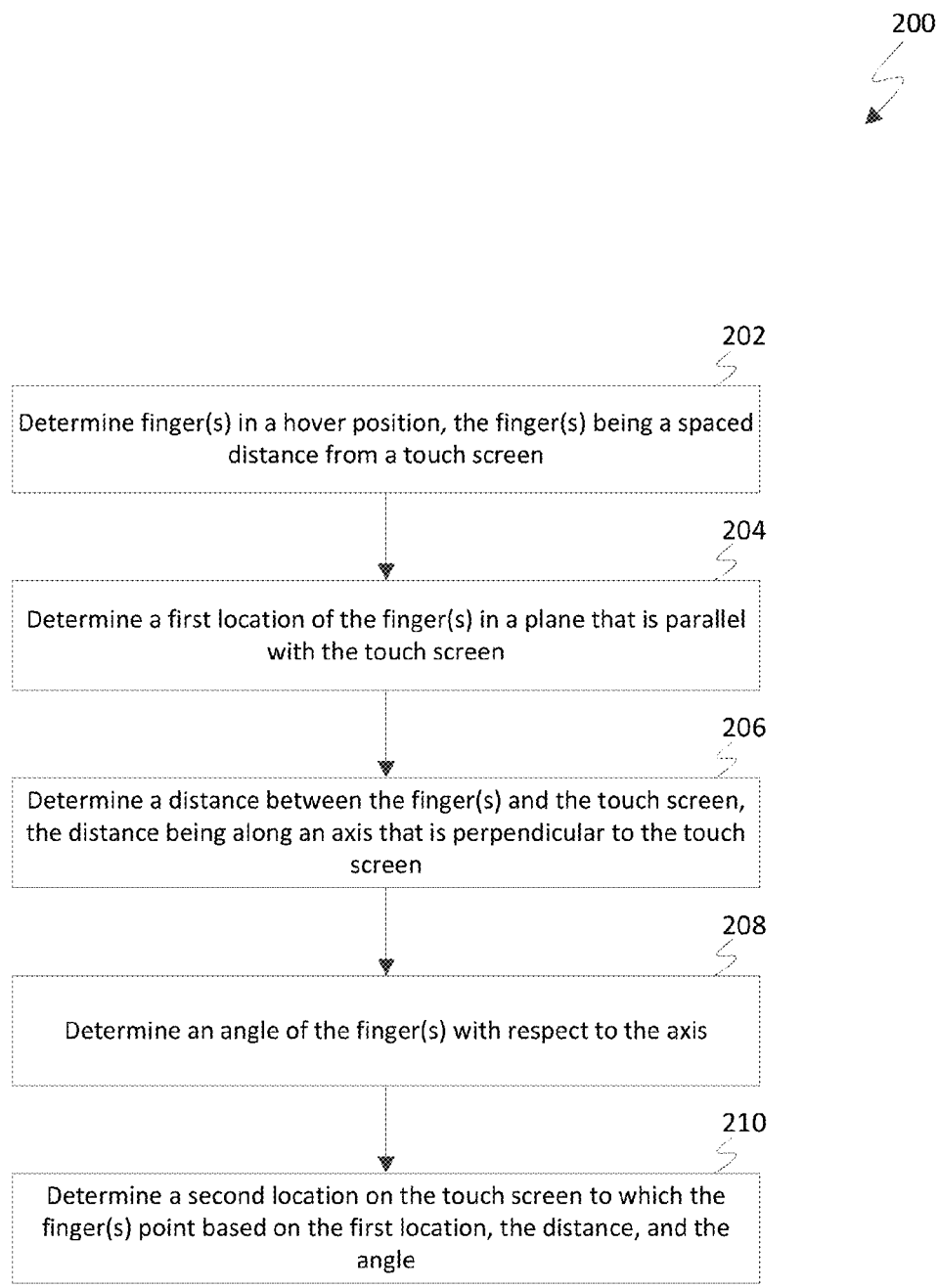
FIGS. 2-4 and 6 depict flowcharts of example methods for increasing touch and/or hover accuracy on a touch-enabled device in accordance with embodiments.
Figure 3:
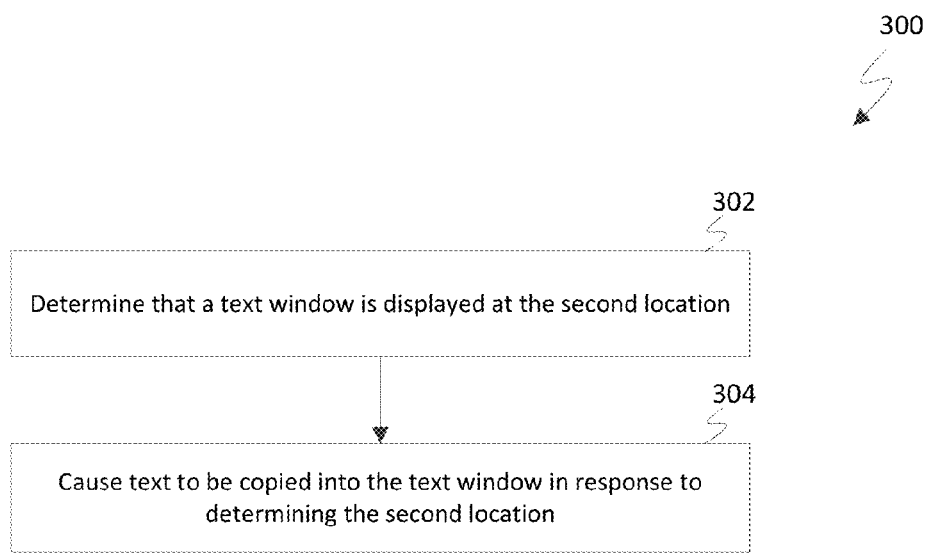
Figure 4:
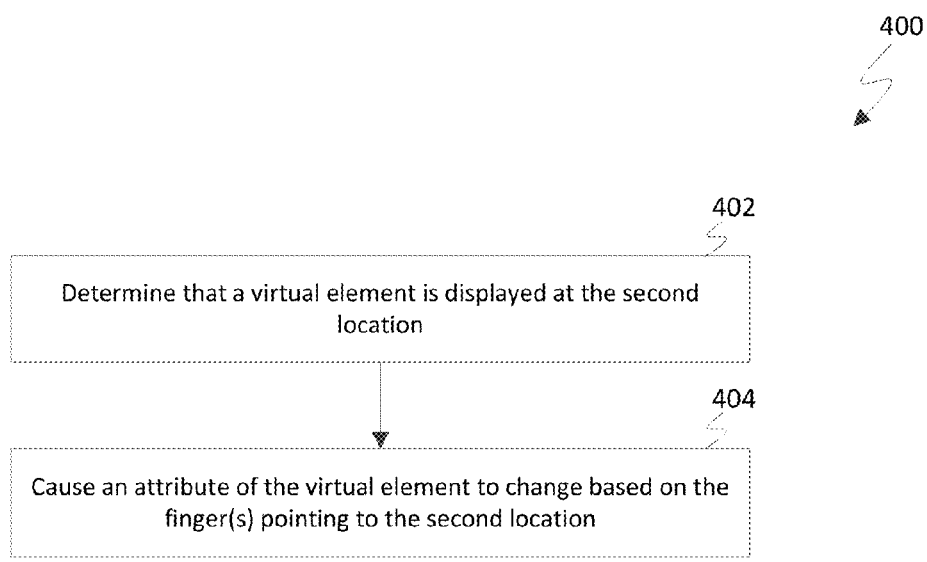
Figure 5:
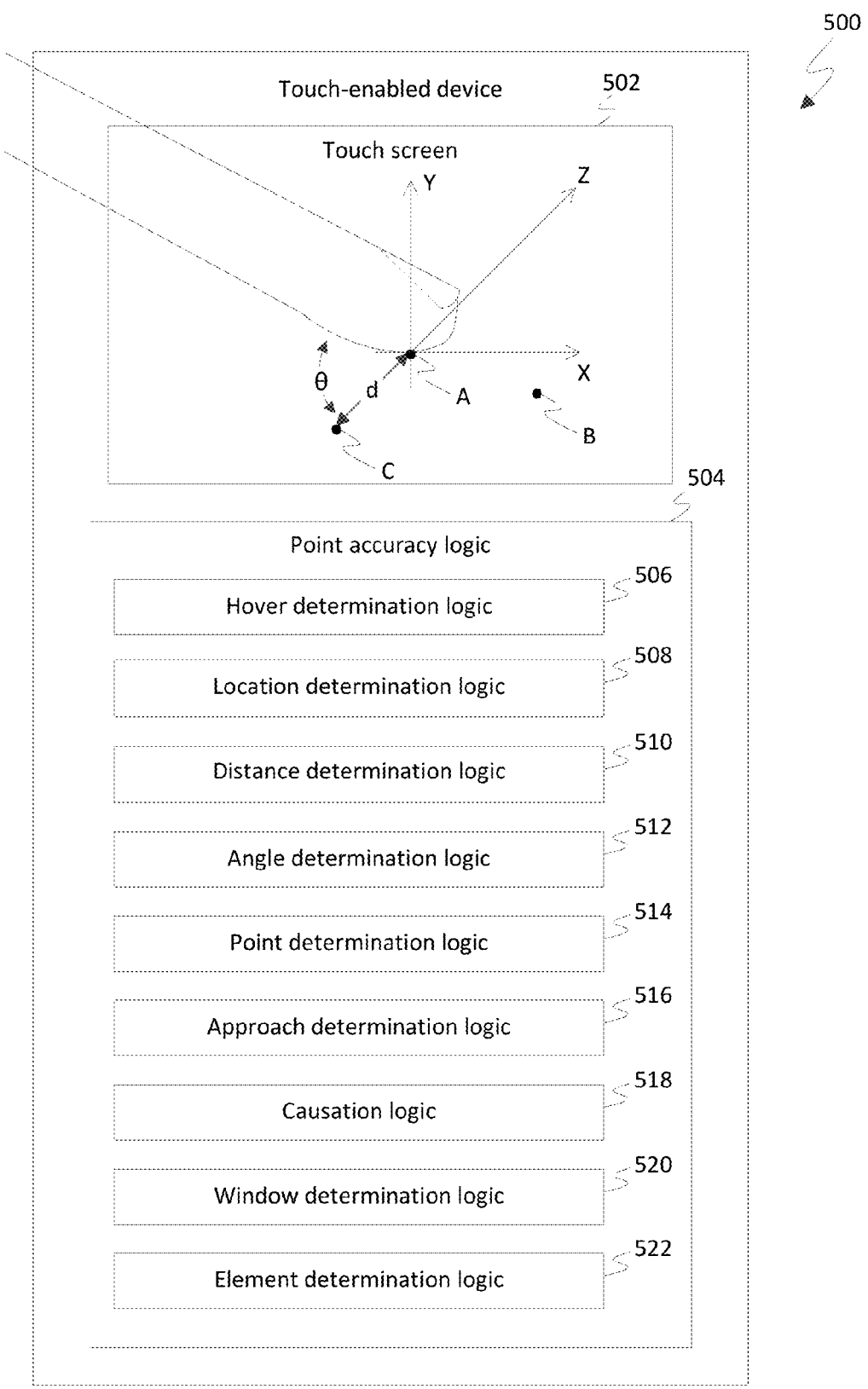

FIGS. 2-4 depict flowcharts 200, 300, and 400 of example methods for increasing touch and/or hover accuracy on a touch-enabled device in accordance with embodiments. Flowcharts 200, 300, and 400 may be performed by a touch-enabled device, for example. For illustrative purposes, flowcharts 200, 300, and 400 are described with respect to touch-enabled device 500 shown in FIG. 5. As shown in FIG. 5, touch-enabled device 500 includes touch screen 502 and point accuracy logic 504. Point accuracy logic 504 includes hover determination logic 506, location determination logic 508, distance determination logic 510, angle determination logic 512, point determination logic 514, approach determination logic 516, causation logic 518, window determination logic 520, and element determination logic 522. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, finger(s) in a hover position are determined. For instance, a presence of the finger(s) in the hover position may be determined. The finger(s) are a spaced distance from a touch screen. A hover position occurs when one or more fingers are placed above a touch screen by a spaced distance (which can be any distance whether it be predetermined or based on reception of a signal), but without the one or more fingers physically touching the touch screen. Determination means that a touch sensor (e.g., hover-enabled touch screen sensor 104) recognizes that one or more fingers are near the touch screen. In an example implementation, hover determination logic 506 determines the finger(s) in the hover position a spaced distance, d, from touch screen 502. As shown in FIG. 5, point C represents a location on touch screen 502, and the finger(s) are shown to be at a first location A, which is the spaced distance d from point C on touch screen 502. For instance, the finger(s) may be a spaced distance from a touch screen sensor (e.g., hover-enabled touch screen sensor 104) on touch screen 502.

In an example embodiment, determining the finger(s) in the hover position at step 202 causes a hover mode to be entered. In accordance with this embodiment, once the hover mode is entered, then hover commands (e.g., hover gesture(s)) can be detected as described in further detail below.

At step 204, a first location of the finger(s) in a plane that is parallel with the touch screen is determined. In an example implementation, location determination logic 508 determines the first location, A, of the finger(s) in a plane that is parallel with touch screen 502. As shown in FIG. 5, an X-axis, a Y-axis, and a Z-axis define a three-dimensional space. The X-axis and the Y-axis define the plane that is parallel with touch screen 502. The Z-axis is perpendicular to touch screen 502.

At step 206, a distance between the finger(s) and the touch screen is determined. The distance is along an axis that is perpendicular to the touch screen. In an example implementation, distance determination logic 510 determines the distance, d, between the finger(s) and touch screen 502 along the Z-axis, which is perpendicular to touch screen 502.

At step 208, an angle of the finger(s) with respect to the axis is determined. In an example implementation, angle determination logic 512 determines an angle, θ, between the fingers and the Z-axis.

At step 210, a second location on the touch screen to which the finger(s) point is determined based on the first location, the distance, and the angle. The second location may be different from the first location or the same as the first location. In an example implementation, point determination logic 514 determines a second location, B, on touch screen 502 to which the finger(s) point based on the first location A, the distance d, and the angle θ.

In an example embodiment, the first location which is determined at step 204 and/or the distance which is determined at step 206 is based on a centroid of the finger(s). The centroid of the finger(s) is a portion (e.g., a point) of the finger(s) that is closest to the touch screen.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 includes determining that the finger(s) are approaching the touch screen. In accordance with this embodiment, step 210 is performed in response to determining that the finger(s) are approaching the touch screen. In an example implementation, approach determination logic 516 determines that the finger(s) are approaching touch screen 502.

In another example embodiment, the method of flowchart 200 includes causing a cursor to be displayed at the second location in response to determining the second location. In an example implementation, causation logic 518 causes the cursor to be displayed at the second location. For instance, causation logic 518 may cause the cursor to be displayed at the second location in a text field or in a window.

In yet another example embodiment, the method of flowchart 200 includes causing a textual character associated with a virtual button that is positioned at the second location to be selected in response to determining the second location. In an example implementation, causation logic 518 causes the textual character associated with the virtual button that is positioned at the second location, B, to be selected.

In still another example embodiment, the method of flowchart 200 includes one or more of the steps shown in flowchart 300 of FIG. 3. As shown in FIG. 3, the method of flowchart 300 begins at step 302. In step 302, a determination is made that a text window is displayed at the second location. In an example implementation, window determination logic 520 determines that the text window is displayed at the second location, B.

At step 304, text is caused to be copied into the text window in response to determining the second location. In an example implementation, causation logic 518 causes the text to be copied into the text window in response to determining the second location, B.

In yet another example embodiment, the method of flowchart 200 includes one or more of the steps shown in flowchart 400 of FIG. 4. As shown in FIG. 4, the method of flowchart 400 begins at step 402. In step 402, a determination is made that a virtual element is displayed at the second location. For instance, the virtual element may be a hyperlink to a web page, a contact in a list of contacts, one or more appointment labels (e.g., in a daily, weekly, or monthly view of a calendar), a representation of a message (e.g., an email), a representation of a movie, etc. In an example implementation, element determination logic 522 determines that the virtual element is displayed at the second location, B.

At step 404, an attribute of the virtual element is caused to change based on the finger(s) pointing to the second location. For instance, causing the attribute of the virtual element to change may indicate to a user that the virtual element will be selected if the user taps the touch screen. Changing the attribute may therefore enable the user to move the finger(s) with respect to the touch screen until the attribute of a desired virtual element is changed. Upon observing a change of the attribute of the desired virtual element, the user may tap on the touch screen to select the desired virtual element (e.g., with a greater confidence and/or likelihood that tapping the touch screen will result in selection of the desired virtual element). It will be recognized that selection of a virtual element may occur in any of a variety of ways. Tapping a touch screen is merely one example way in which a virtual element may be selected, and the example embodiments are not limited in this respect.

In an example implementation, causation logic 518 causes the attribute of the virtual element to change based on the finger(s) pointing to the second location, B. For instance, causation logic 518 may cause the virtual element to be visually distinguished (e.g., highlighted) from other virtual elements that are displayed on the touch screen. In an example of this implementation, causation logic 518 may cause a size of the virtual element to change. In an aspect of this example, causation logic 518 may cause a size of the virtual element to increase with respect to other virtual elements that are displayed on the touch screen (and/or cause the other virtual elements to become smaller). In another aspect, causation logic 518 may cause the size of the virtual element to decrease with respect to other virtual elements that are displayed on the touch screen (and/or cause the other virtual elements to become larger). In yet another aspect, the virtual element may be a tile in a tiled interface. Causation logic 518 may cause the tile to unfold from a folded state to an unfolded state in which the tile is larger (e.g., to include more content than the tile in the folded state).

In another example, causation logic 518 may cause a location or an orientation of the virtual element to change. For instance, causation logic 518 may cause the virtual element to vibrate, rotate, flip, move, shift in a designated (e.g., predetermined) direction (e.g., up, down, left, right, or any combination thereof), etc.

In yet another example, causation logic 518 may cause a visual characteristic of the virtual element to change. For instance, causation logic 518 may cause the virtual element to blink, change color, become more opaque (e.g., non-transparent or less translucent), etc.

The attributes mentioned above are provided for illustrative purposes and are not intended to be limiting. It will be recognized that causation logic 518 may cause any suitable one or more attributes of the virtual element to be changed.

If the finger(s) are moved across the touch screen, the finger(s) may point to a plurality of second locations at a plurality of respective time instances (e.g., a plurality of consecutive time instances). A plurality of virtual elements may be displayed at the plurality of respective second locations. The attribute of each of the plurality of virtual elements may be caused to change based on the finger(s) pointing to the corresponding second location at which the respective virtual element is displayed. For instance, the attribute of each of the plurality of virtual elements may be caused to change at the time instance at which the finger(s) point to the corresponding second location.

It will be recognized that touch-enabled device 500 may not include one or more of hover determination logic 506, location determination logic 508, distance determination logic 510, angle determination logic 512, point determination logic 514, approach determination logic 516, causation logic 518, window determination logic 520, and/or element determination logic 522. Furthermore, touch-enabled device 500 may include logic in addition to or in lieu of point accuracy logic 504, hover determination logic 506, location determination logic 508, distance determination logic 510, angle determination logic 512, point determination logic 514, approach determination logic 516, causation logic 518, window determination logic 520, and/or element determination logic 522.

Figure 6:
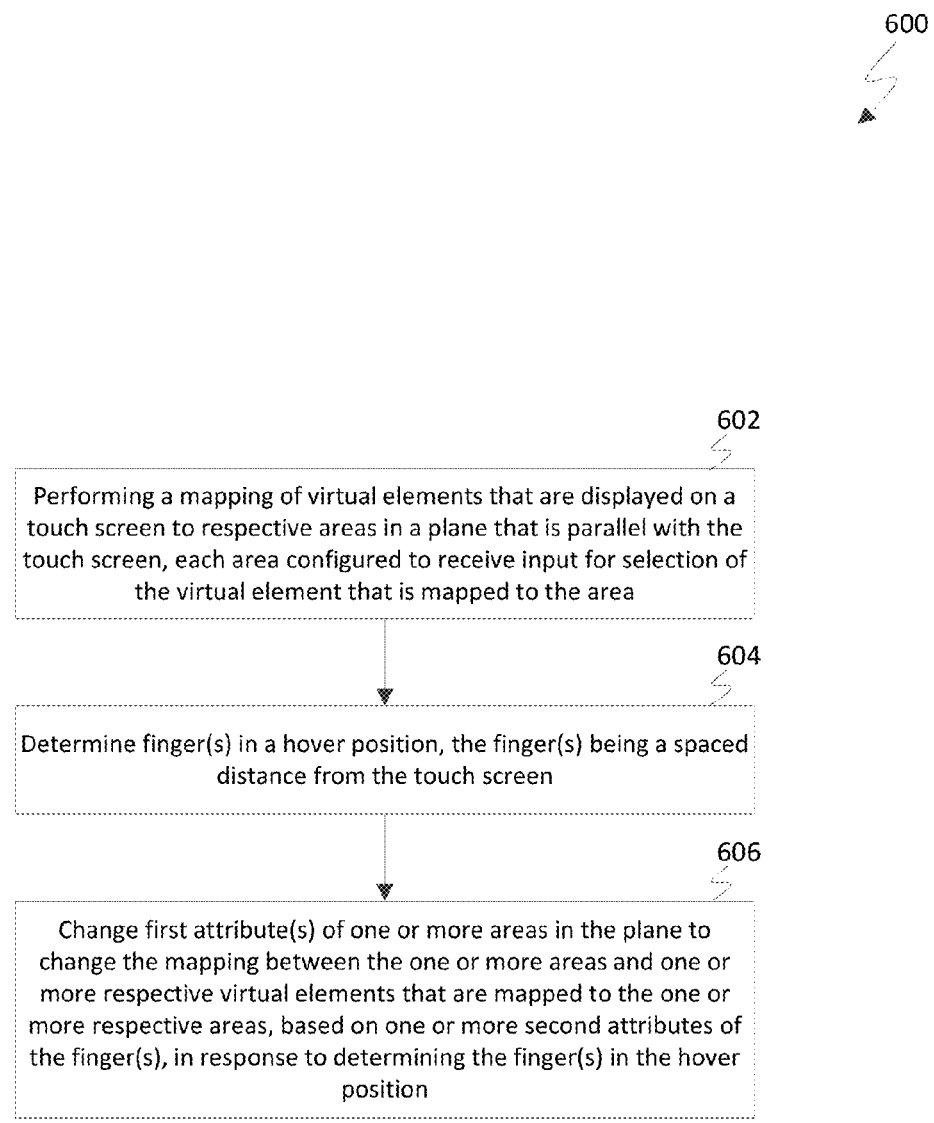
Figure 7:
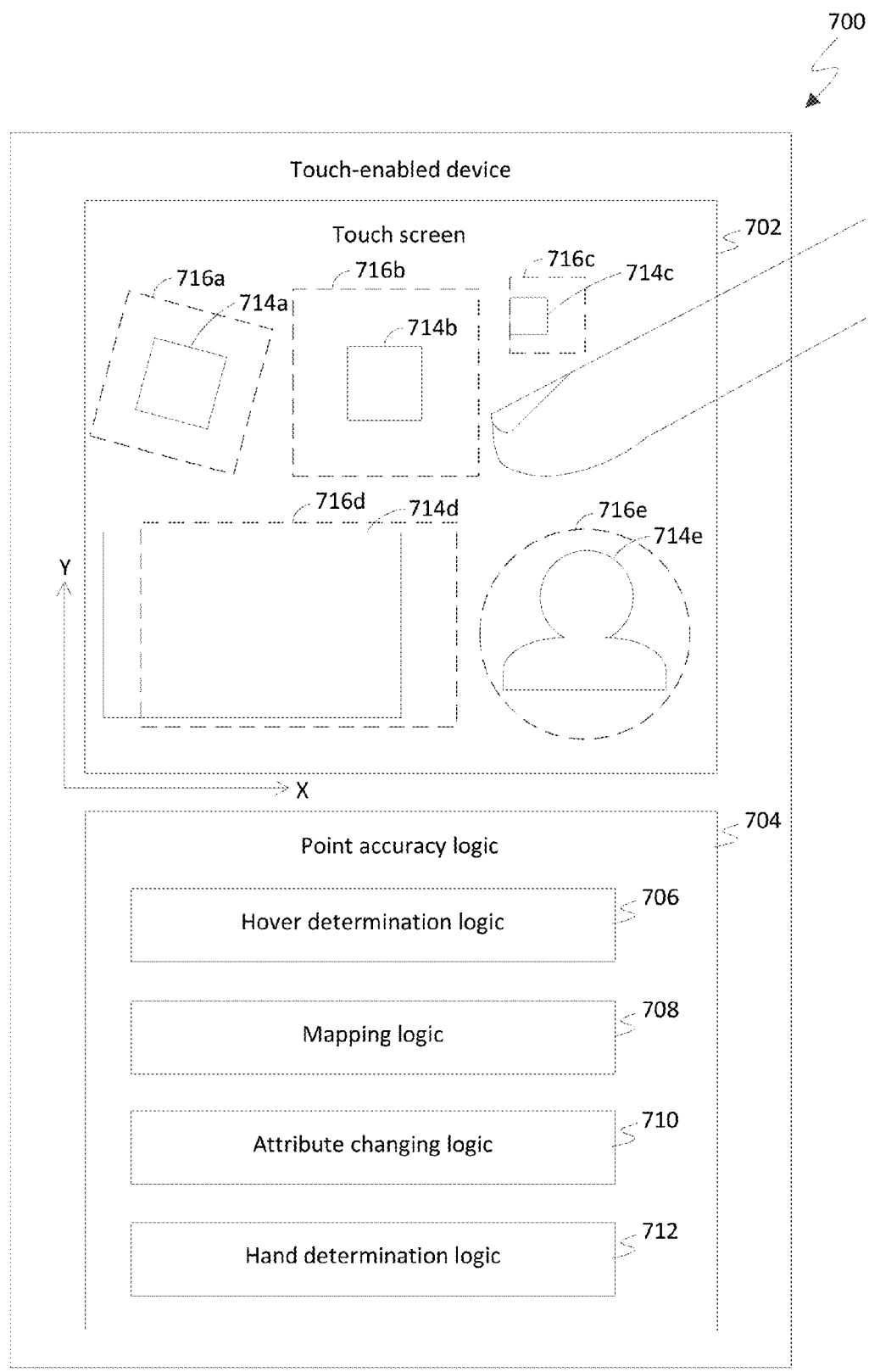

FIG. 6 depicts a flowchart 600 of another example method for increasing touch and/or hover accuracy on a touch-enabled device in accordance with an embodiment. Flowchart 600 may be performed by a touch-enabled device, for example. For illustrative purposes, flowchart 600 is described with respect to touch-enabled device 700 shown in FIG. 7. As shown in FIG. 7, touch-enabled device 700 includes touch screen 702 and point accuracy logic 704. Point accuracy logic 704 includes hover determination logic 706, mapping logic 708, attribute changing logic 710, and hand determination logic 712. Further structural and operational embodiments will be apparent to persons skilled in the relevant art(s) based on the discussion regarding flowchart 600.

As shown in FIG. 6, the method of flowchart 600 begins at step 602. In step 602, a mapping of virtual elements that are displayed on a touch screen to respective areas in a plane that is parallel with the touch screen is performed. Each area is configured to receive input for selection of the virtual element that is mapped to the area. In an example implementation, mapping logic 708 performs a mapping of virtual elements 714a-714e, which are displayed on touch screen 702 to respective areas 716a-716e in a plane that is parallel with touch screen 702. The plane is defined by an X-axis and a Y-axis, as shown in FIG. 7. Each area 716a, b, c, d, or e is configured to receive input for selection of the virtual element 714a, b, c, d, or e that is mapped to the area 716a, b, c, d, or e.

Each of virtual elements 714a-714e and areas 716a-716e may be any suitable shape, size, orientation, etc. For instance, each of virtual elements 714a-714c and areas 716a-716c is shown to be a square for illustrative purposes. Each of virtual elements 714b and 714c and areas 716b and 716c has two opposing sides parallel with the X-axis and two opposing sides parallel with the Y-axis; whereas virtual element 714a and area 716a are shown to be tilted at an angle with regard to the X-axis and the Y-axis.

Virtual elements 714a-714c are shown to be entirely included in respective areas 716a-716c. An outer boundary of virtual element 714a is not coincident with any portion of an outer boundary of area 716a, and an outer boundary of virtual element 714b is not coincident with any portion of an outer boundary of area 716b. However, a portion (e.g., a left edge in this example) of virtual element 714c is coincident with a portion (e.g., a left edge in this example) of area 716c. It will be recognized that any none or more portions of an outer boundary of a virtual element may be coincident with any one or more portions (e.g., edges or sides) of an outer boundary of a corresponding area.

Virtual elements 714a and 714b are shown to be the same size, and their corresponding areas 716a and 716c are shown to be different sizes. For instance, area 716b extends beyond each side of virtual element 714b to a great extent than area 716a extends beyond each side of virtual element 714a. Accordingly, a ratio of a size of virtual element 714a and a size of area 716a is different from a ratio of a size of virtual element 714b and a size of area 716b.

Virtual element 714d and area 716d are shown to be rectangles that partially overlap for illustrative purposes. For instance, a first portion of virtual element 714d is within an outer boundary of area 716d, and a second portion of virtual element 714d is outside an outer boundary of area 716d. No portion of an outer boundary of virtual element 714d is coincident with a portion of an outer boundary of area 716d, though the scope of the example embodiments is not limited in this respect.

Virtual element 714e has a shape that is different from a shape of its corresponding area 716e. In particular, virtual element 714e is shown to be an outline of a human's head and shoulders, and area 716e is shown to be a circle. An outer boundary of area 716e is shown to surround an entirety of virtual element 714e, though the scope of the example embodiments is not limited in this respect. For example, it will be recognized that an outer boundary of area 716e may surround a portion (i.e., less than all) of virtual element 714e. In another example, an outer boundary of virtual element 714e may surround an entirety of area 716e. In accordance with this example, an outer boundary of area 716e may be included within an outer boundary of virtual element 714e.

The example shapes, sizes, orientations, ratios, etc. of virtual elements 714a-714e and areas 716a-716e mentioned above are provided for illustrative purposes and are not intended to be limiting. Moreover, any suitable number of virtual elements may be displayed on touch screen 702.

At step 604, finger(s) in a hover position are determined. The finger(s) are a spaced distance from the touch screen. In an example implementation, hover determination logic 706 determines the finger(s) in the hover position at a spaced distance from touch screen 702.

At step 606, first attribute(s) of one or more areas in the plane are changed to change the mapping between the one or more areas and one or more respective virtual elements that are mapped to the one or more respective areas, based on one or more second attributes of the finger(s), in response to determining the finger(s) in the hover position. Examples of a first attribute of an area include but are not limited to a size, a shape, a location (a.k.a. position), and an orientation of the area. Examples of a second attribute include but are not limited to a size of one or more of the finger(s); a location of the finger(s) with respect to at least one of the X-axis, the Y-axis, and the Z-axis (e.g., a location of the finger(s) in a two-dimensional space or a three-dimensional space); an angle of the finger(s) with respect to the plane that is parallel with the touch screen; an angle of the finger(s) with respect to the Z-axis which is perpendicular to the plane; a direction from which the finger(s) approach the touch screen, etc. The direction from which the finger(s) approach the touch screen may indicate an edge of a device (e.g., touch-enabled device 700), which includes the touch screen, from which the finger(s) approach the touch screen. For instance, the direction may be in the plane that is parallel with the touch screen.

It will be recognized that if the first attribute(s) are changed based on the angle of the finger(s) with respect to the plane, it can be said that the first attribute(s) are changed based on the angle of the finger(s) with respect to the Z-axis. It will be further recognized that if the first attribute(s) are changed based on the angle of the finger(s) with respect to the Z-axis, it can be said that the first attribute(s) are changed based on the angle of the finger(s) with respect to the plane. For instance, the angle of the finger(s) with respect to the plane is equal to ninety degrees minus the angle of the finger(s) with respect to the Z-axis. Similarly, the angle of the finger(s) with respect to the Z-axis is equal to ninety degrees minus the angle of the finger(s) with respect to the plane.

In an example implementation, attribute changing logic 710 changes first attribute(s) of one or more areas 716a, b, c, d, and/or e in the plane to change the mapping between the one or more areas 716a, b, c, d, and/or e and one or more respective virtual elements 714a, b, c, d, and/or e that are mapped to the one or more respective areas 716a, b, c, d, and/or e, based on one or more second attributes of the finger(s), in response to determining the finger(s) in the hover position.

In an example embodiment, step 606 includes changing at least one size of at least one respective area of the one or more areas. In an aspect, the at least one size of the at least one respective area may be changed without changing at least one size of at least one respective virtual element that is mapped to the at least one respective area. In another aspect, the at least one size of the at least one respective area may be changed without changing the at least one size of the at least one respective virtual element that is mapped to the at least one respective area to a same extent that the at least one size of the at least one respective area is changed. In accordance with this aspect, the at least one size of the at least one respective virtual element is increased or decreased, but to a lesser extent than the at least one size of the at least one respective area.

In another example embodiment, step 606 includes changing at least one location of at least one respective area in the plane. In accordance with this embodiment, the at least one area is included in the one or more areas. In an aspect, the at least one location of the at least one respective area may be changed without changing at least one location of at least one respective virtual element that is mapped to the at least one respective area.

In another aspect, the at least one location of the at least one respective area may be changed without changing the at least one location of the at least one respective virtual element that is mapped to the at least one respective area to a same extent that the at least one location of the at least one respective area is changed. In accordance with this aspect, a distance over which the at least one location of the at least one respective virtual element is changed is less than a distance over which the at least one location of the at least one respective area is changed. For instance, if a determination is made that a hand is approaching the touch screen from a right side, the one or more virtual elements may be moved toward the right side (e.g., in an effort to facilitate ease of access to the one or more virtual elements), and the one or more areas to which the one or more respective virtual elements are mapped may be moved toward the right side to a greater extent than the one or more virtual elements (e.g., in an effort to increase accuracy of selection of any of the one or more virtual elements).

In some example embodiments, one or more steps 602, 604, and/or 606 of flowchart 600 may not be performed. Moreover, steps in addition to or in lieu of steps 602, 604, and/or 606 may be performed. For instance, in an example embodiment, the method of flowchart 600 includes determining that the finger(s) correspond to a designated hand. In accordance with this embodiment, the designated hand is a right hand or a left hand. For instance, hand determination logic 712 may determine that the finger(s) correspond to the designated hand.

In a first aspect of this embodiment, step 606 may include changing the first attribute(s) to compensate for use of each of the virtual elements by the designated hand. For instance, attribute changing logic 710 may change the first attribute(s) to compensate for use of each of virtual elements 714a-714e by the designated hand.

In a second aspect of this embodiment, step 606 may include changing the first attribute(s) of the one or more areas, which correspond to one or more respective first virtual elements in a first subset of the virtual elements, to compensate for use of the one or more first virtual elements by the designated hand. In accordance with this aspect, step 606 may further include changing the first attribute(s) of one or more second areas, which correspond to one or more respective second virtual elements in a second subset of the virtual elements, to compensate for use of the one or more second virtual elements by the right hand or the left hand that is not the designated hand. For example, attribute changing logic 710 may change the first attribute(s) to compensate for use of the one or more first virtual elements by the right hand and to compensate for use of the one or more second virtual elements by the left hand. In another example, attribute changing logic 710 may change the first attribute(s) to compensate for use of the one or more first virtual elements by the left hand and to compensate for use of the one or more second virtual elements by the right hand.

It will be recognized that touch-enabled device 700 may not include one or more of hover determination logic 706, mapping logic 708, attribute changing logic 710, and/or hand determination logic 712. Furthermore, touch-enabled device 700 may include logic in addition to or in lieu of point accuracy logic 704, hover determination logic 706, mapping logic 708, attribute changing logic 710, and/or hand determination logic 712.

Figure 8:
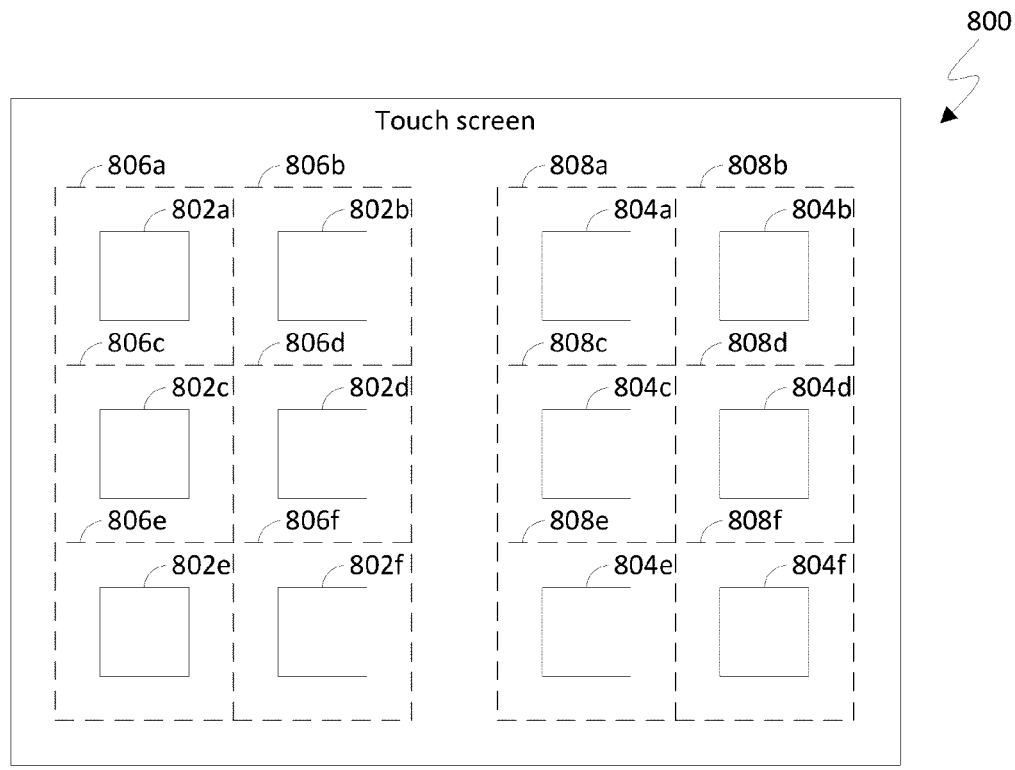
FIGS. 8-9 are depictions of a touch screen to illustrate an example change of mapping between virtual elements and corresponding areas in accordance with embodiments.
Figure 9:
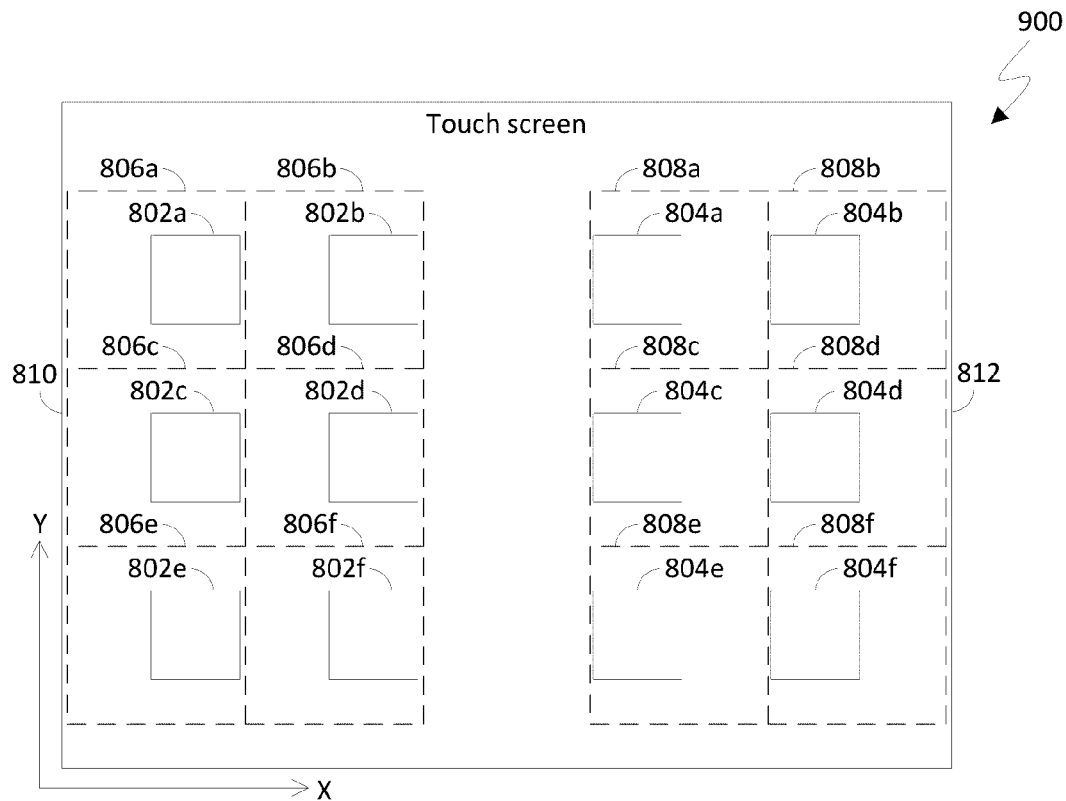

FIGS. 8-9 are depictions 800 and 900 of a touch screen to illustrate an example change of mapping between virtual elements and corresponding areas in accordance with embodiments. As shown in FIG. 8, virtual elements 802a-802f and 804a-804f are displayed on the touch screen. Virtual elements 802a-802f are mapped to respective areas 806a-806f. Virtual elements 804a-804f are mapped to respective areas 808a-808f. Each of areas 806a-806f and 808a-808f is configured to receive input for selection of the virtual element that is mapped to that area. Virtual elements 802a-802f are shown to be centered within areas 806a-806f, and virtual elements 804a-804e are shown to be centered within areas 808a-808f, for illustrative purposes.

As shown in FIG. 9, the positions of respective areas 806a-806f and 808a-808f are changed along an X-axis, as compared to their positions in FIG. 8. In particular, areas 806a-806f are shifted to the left (i.e., toward a left edge 810 of the touch screen) such that virtual elements 802a-802f are no longer centered within areas 806a-806f, and areas 808a-808f are shifted to the right (i.e., toward a right edge 812 of the touch screen) such that virtual elements 804a-804f are no longer centered within areas 808a-808f. For instance, the positions of respective areas 806a-806f and 808a-808f may be changed as shown in FIG. 9 to compensate for use of virtual elements 802a-802f by a left hand and to compensate for use of virtual elements 804a-804f by a right hand.

It will be recognized that any one or more of areas 806a-806f and 808a-808f may be shifted in any direction. Each area may be shifted independently from other areas or in combination with one or more other areas. Any one or more of areas 806a-806f and 808a-808f may not be shifted. The position of each area is merely one attribute that may be changed to change the mapping between the area and its corresponding virtual element (i.e., the virtual element that is mapped to the area). It will be recognized that any one or more suitable attributes of an area may be changed to change the mapping between the area and its corresponding virtual element.

Figure 10:
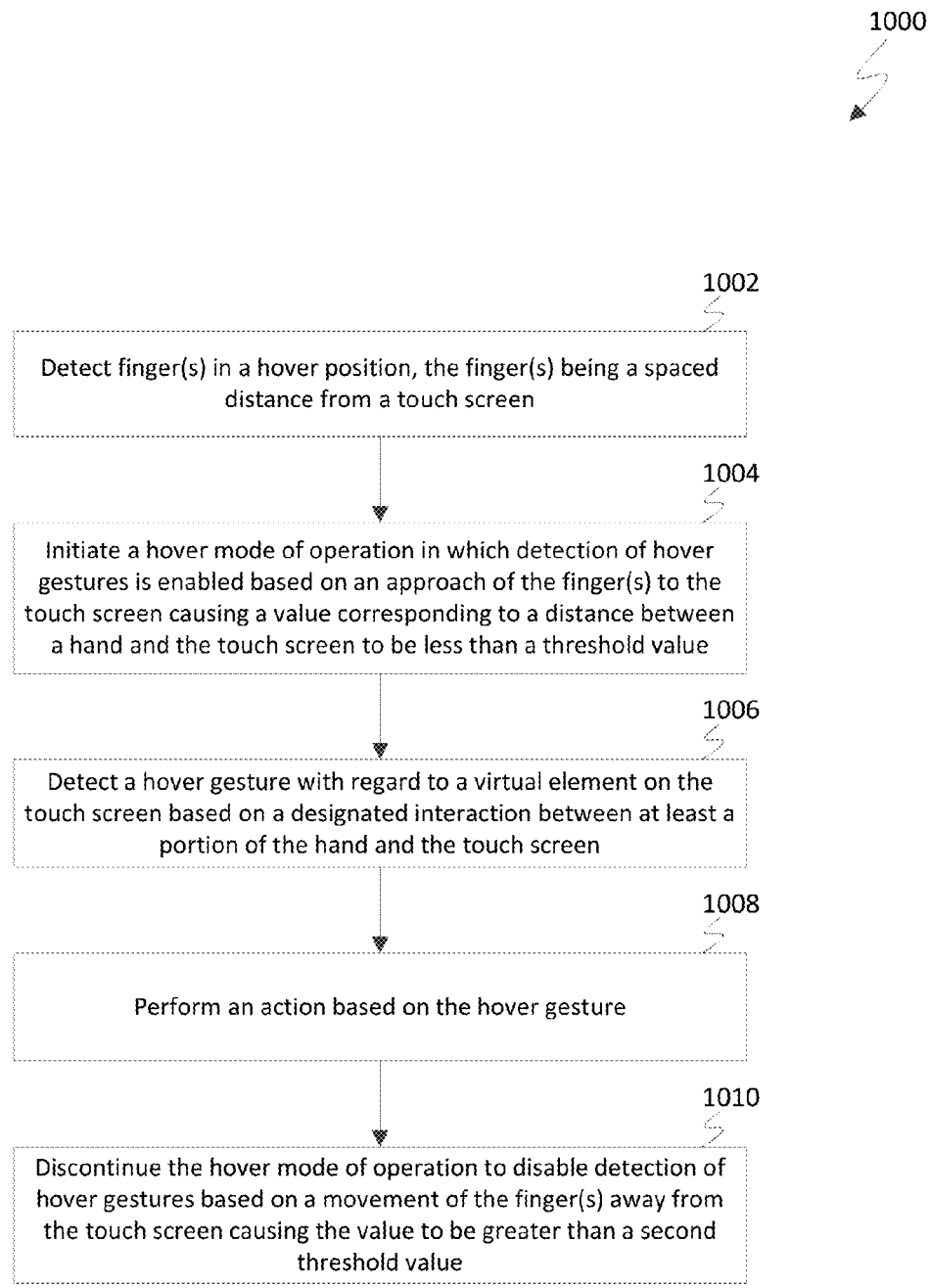
FIG. 10 depicts a flowchart of an example method for performing an action based on a hover gesture in accordance with an embodiment.
Figure 11:
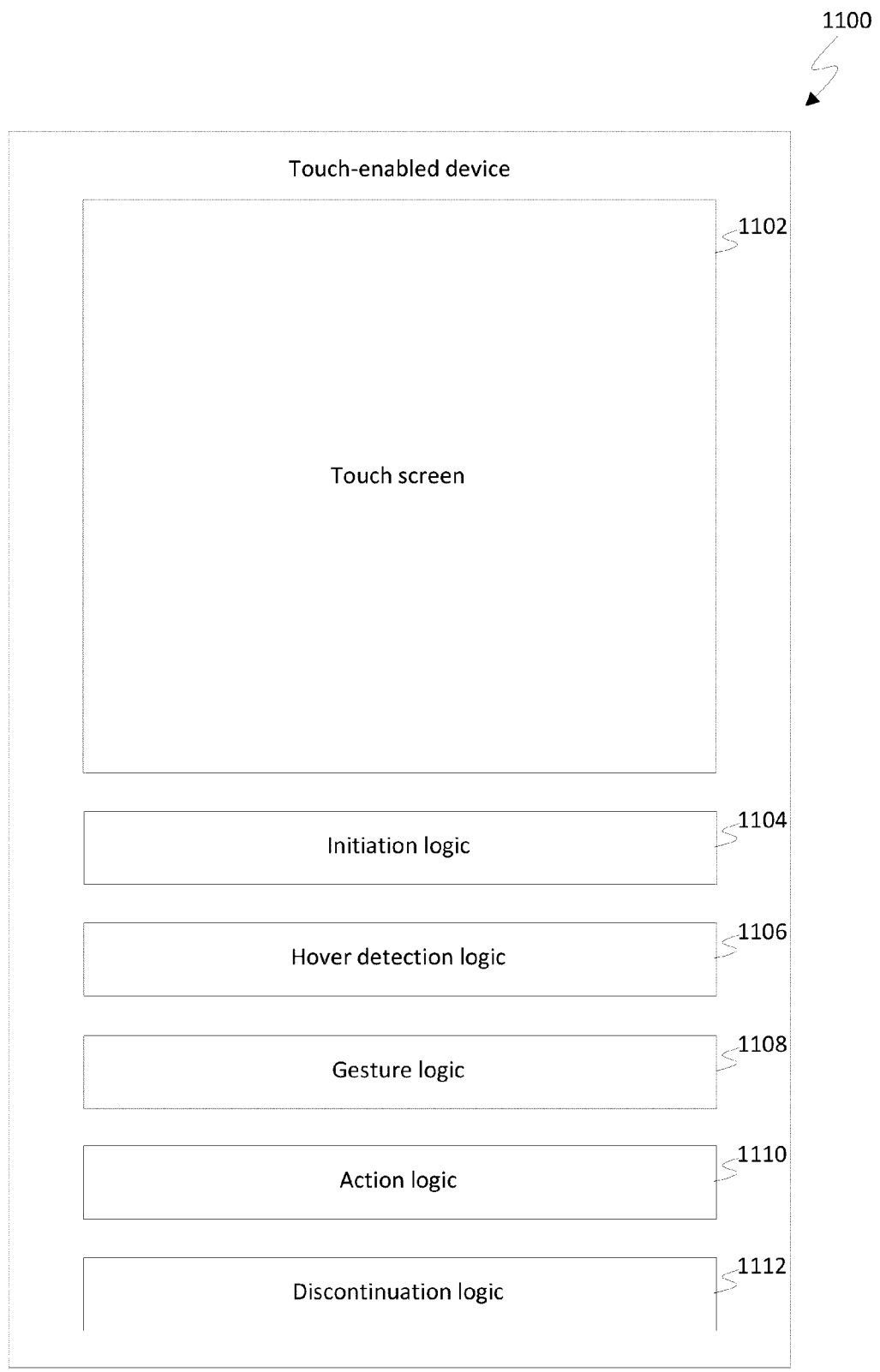

FIG. 10 depicts a flowchart 1000 of an example method for performing an action based on a hover gesture in accordance with an embodiment. Flowchart 1000 may be performed by a touch-enabled device, for example. For illustrative purposes, flowchart 1000 is described with respect to touch-enabled device 1100 shown in FIG. 11. As shown in FIG. 11, touch-enabled device 1100 includes touch screen 1102, initiation logic 1104, hover detection logic 1106, gesture logic 1108, action logic 1110, and discontinuation logic 1112. Further structural and operational embodiments will be apparent to persons skilled in the relevant art(s) based on the discussion regarding flowchart 1000.

As shown in FIG. 10, the method of flowchart 1000 begins at step 1002. In step 1002, finger(s) in a hover position are detected. The finger(s) are a spaced distance from a touch screen. In an example implementation, hover detection logic 1106 detects the finger(s) in the hover position.

At step 1004, a hover mode of operation is initiated in which detection of hover gestures is enabled based on an approach of the finger(s) to the touch screen causing a value corresponding to a distance between a hand and the touch screen to be less than a threshold value. In an example implementation, initiation logic 1104 initiates a hover mode of operation in which detection of hover gestures is enabled based on an approach of the finger(s) to touch screen 1102 causing the value corresponding to the distance between the hand and the touch screen to be less than the threshold value.

At step 1006, a hover gesture is detected with regard to a virtual element on the touch screen based on a designated interaction between at least a portion of the hand and the touch screen. The designated interaction includes an electrical interaction, a magnetic interaction, and/or a light-based interaction. The value that corresponds to the distance between the hand and the touch screen is derived from a magnitude of a measurement of the designated interaction. The hover gesture is a user command to perform an action associated with the virtual element. The hover gesture occurs without the hand touching the touch screen. In an example implementation, gesture logic 1108 detects the hover gesture with regard to a virtual element on touch screen 1102 based on a designated interaction between at least a portion of the hand and touch screen 1102.

In an example embodiment, step 1006 includes detecting that the finger(s) remain in the hover position for at least a specified period of time and that the finger(s) remain within a designated area of a plane that is parallel with the touch screen (e.g., remain motionless) for at least the specified period of time. In an aspect of this embodiment, step 1006 may include determining that the value, which corresponds to the distance between the hand and the touch screen, remains within a designated range of values. For instance, the hand going out of the range and then back into the range may reset a counter that is used to determine the specified period of time. Some other embodiments for detecting a hover gesture are described below with reference to FIGS. 12-14.

At step 1008, the action is performed based on the hover gesture. In an example implementation, action logic 1110 performs the action based on the hover gesture.

In an example embodiment, performing the action includes activating the virtual element. Activating the virtual element means launching a software program (or an instance thereof) associated with the virtual element on an operating system or opening an item that is included in a software program associated with the virtual element on an operating system.

In another example embodiment, the action is performed without activating the virtual element. Accordingly, performing the action at step 1008 may include using features of an operating system to perform the action, so long as a software program associated with the virtual element is not launched on an operating system based on the hover gesture to perform the action and no items that are included in a software program associated with the virtual element are opened on an operating system based on the hover gesture to perform the action.

At step 1010, the hover mode of operation is discontinued to disable detection of hover gestures based on a movement of the finger(s) away from the touch screen causing the value to be greater than a second threshold value. In an example implementation, discontinuation logic 1112 discontinues the hover mode of operation based on the movement of the finger(s) away from touch screen 1102 causing the value to be greater than the second threshold value.

In some example embodiments, one or more steps 1002, 1004, 1006, 1008, and/or 1010 of flowchart 1000 may not be performed. Moreover, steps in addition to or in lieu of steps 1002, 1004, 1006, 1008, and/or 1010 may be performed.

It will be recognized that touch-enabled device 1100 may not include one or more of initiation logic 1104, hover detection logic 1106, gesture logic 1108, action logic 1110, and/or discontinuation logic 1112. Furthermore, touch-enabled device 1100 may include logic in addition to or in lieu of initiation logic 1104, hover detection logic 1106, gesture logic 1108, action logic 1110, and/or discontinuation logic 1112.

Figure 12:
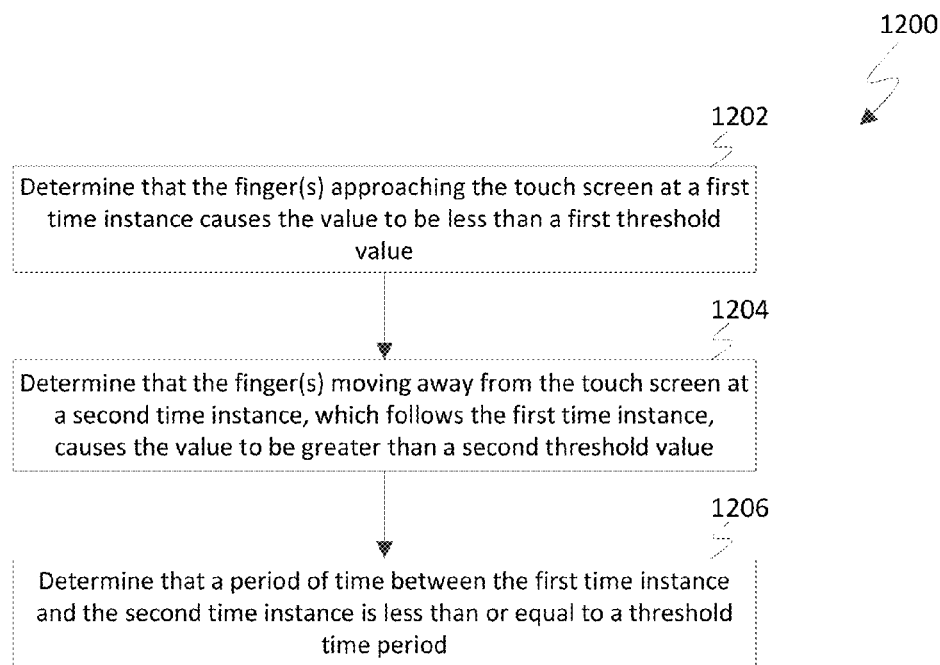
FIGS. 12-14 depict flowcharts of example methods for detecting a hover gesture in accordance with embodiments.
Figure 13:
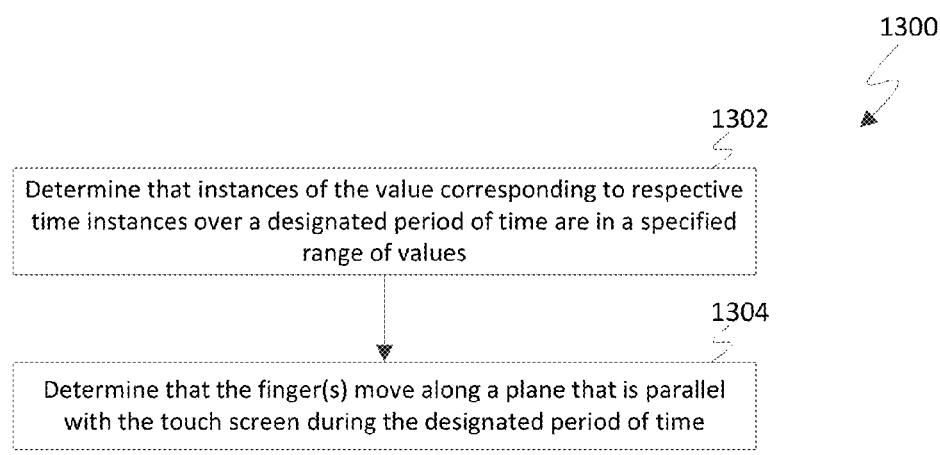
Figure 14:
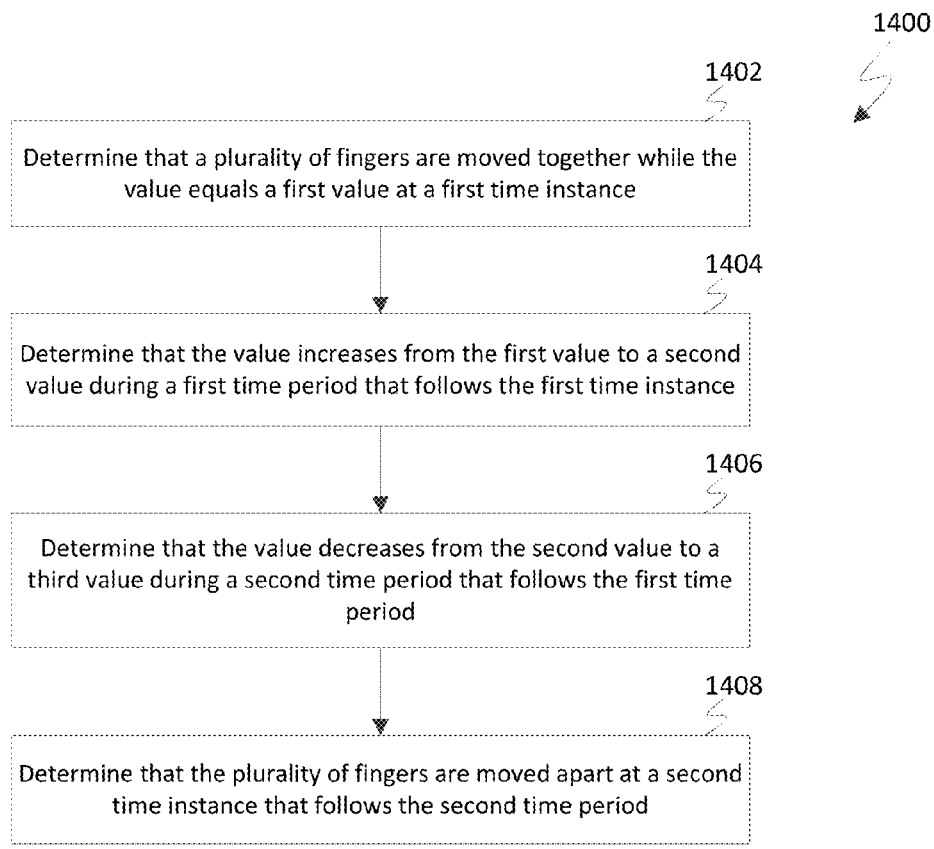
Figure 15:
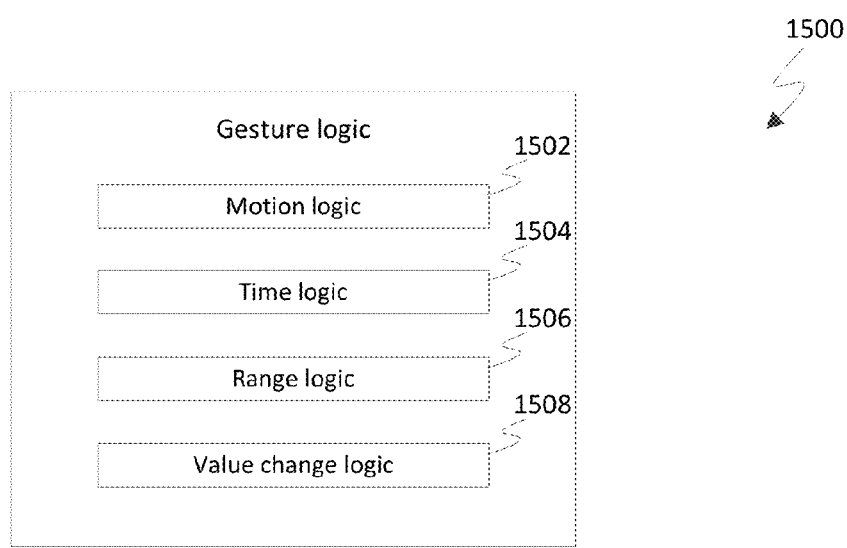
FIG. 15 is a block diagram of an example implementation of gesture logic shown in FIG. 11 in accordance with an embodiment.

FIGS. 12-14 depict flowcharts 1200, 1300, and 1400 of example methods for detecting a hover gesture in accordance with embodiments. Flowcharts 1200, 1300, and 1400 may be performed by gesture logic 1108 shown in FIG. 11, for example. For illustrative purposes, flowcharts 1200, 1300, and 1400 are described with respect to gesture logic 1500 shown in FIG. 15, which is an example of gesture logic 1108, according to an embodiment. As shown in FIG. 15, gesture logic 1500 includes motion logic 1502, time logic 1504, range logic 1506, and value change logic 1508. Further structural and operational embodiments will be apparent to persons skilled in the relevant art(s) based on the discussion regarding flowcharts 1200, 1300, and 1400.

As shown in FIG. 12, the method of flowchart 1200 begins at step 1202. In step 1202, a determination is made that the finger(s) approaching the touch screen at a first time instance causes the value to be less than a first threshold value. In an example implementation, motion logic 1502 determines that the finger(s) approaching touch screen 1102 at the first time instance causes the value to be less than the first threshold value.

At step 1204, a determination is made that the finger(s) moving away from the touch screen at a second time instance, which follows the first time instance, causes the value to be greater than a second threshold value. In an example implementation, motion logic 1502 determines that the finger(s) moving away from touch screen 1102 at the second time instance causes the value to be greater than the second threshold value.

At step 1206, a determination is made that a period of time between the first time instance and the second time instance is less than or equal to a threshold time period. In an example implementation, time logic 1504 determines that the period of time between the first time instance and the second time instance is less than or equal to the threshold time period.

As shown in FIG. 13, the method of flowchart 1300 begins at step 1302. In step 1302, a determination is made that instances of the value corresponding to respective time instances over a designated period of time are in a specified range of values. In an example implementation, range logic 1506 determines that the instances of the value corresponding to the respective time instances over the designated period of time are in the specified range of values.

At step 1304, a determination is made that the finger(s) move along a plane that is parallel with the touch screen during the designated period of time. For instance, a determination may be made that the finger(s) move along the plane during the designated period of time at a designated speed, in a designated direction, a designated distance (e.g., an actual distance or a number of pixel units that correspond to the actual distance), a designated number of times, and/or involving a designated number of direction reversals, though the scope of the example embodiments is not limited in this respect. It will be recognized that a value corresponding to the designated distance may be derived from a magnitude of a measurement of the designated interaction, which is mentioned above with reference to step 1006 of flowchart 1000 shown in FIG. 10, or other interaction between at least the portion of the hand and the touch screen. In an example implementation, motion logic 1502 determines that the finger(s) move along the plane during the designated period of time.

As shown in FIG. 14, the method of flowchart 1400 begins at step 1402. In step 1402, a determination is made that a plurality of fingers are moved together while the value equals a first value at a first time instance. In an example implementation, motion logic 1502 determines that the plurality of fingers are moved together while the value equals the first value at the first time instance.

At step 1404, a determination is made that the value increases from the first value to a second value during a first time period that follows the first time instance. In an example implementation, value change logic 1508 determines that the value increases from the first value to the second value during the first time period.

At step 1406, a determination is made that the value decreases from the second value to a third value during a second time period that follows the first time period. In an example implementation, value change logic 1508 determines that the value decreases from the second value to the third value during the second time period.

At step 1408, a determination is made that the plurality of fingers are moved apart at a second time instance that follows the second time period. In an example implementation, motion logic 1502 determines that the plurality of fingers are moved apart at the second time instance.

It will be recognized that gesture logic 1500 may not include one or more of motion logic 1502, time logic 1504, range logic 1506, and/or value change logic 1508. Furthermore, gesture logic 1500 may include logic in addition to or in lieu of motion logic 1502, time logic 1504, range logic 1506, and/or value change logic 1508.

Figure 16:
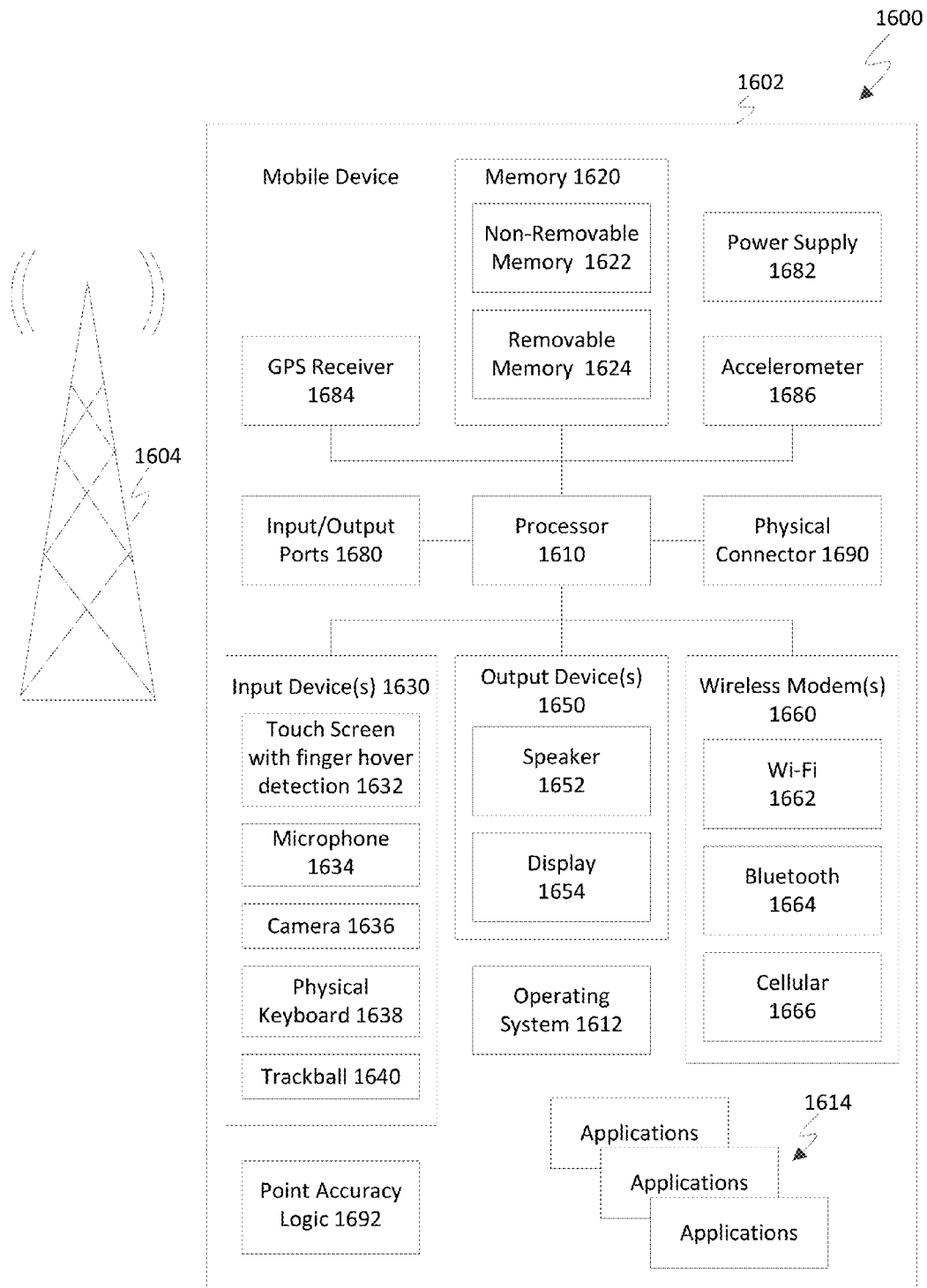
FIG. 16 is a system diagram of an exemplary mobile device with a touch screen for sensing touch and hover commands in accordance with an embodiment.

FIG. 16 is a system diagram depicting an exemplary mobile device 1600 including a variety of optional hardware and software components, shown generally as 1602. Any components 1602 in the mobile device can communicate with any other component, though not all connections are shown, for ease of illustration. The mobile device 1600 can be any of a variety of computing devices (e.g., cell phone, smartphone, handheld computer, Personal Digital Assistant (PDA), etc.) and can allow wireless two-way communications with one or more mobile communications networks 1604, such as a cellular or satellite network, or with a local area or wide area network.

The illustrated mobile device 1600 can include a controller or processor 1610 (e.g., signal processor, microprocessor, ASIC, or other control and processing logic circuitry) for performing such tasks as signal coding, data processing, input/output processing, power control, and/or other functions. An operating system 1612 can control the allocation and usage of the components 1602 and support for one or more application programs 1614 (a.k.a. applications). The application programs 1614 can include common mobile computing applications (e.g., email applications, calendars, contact managers, web browsers, messaging applications) and any other computing applications (e.g., word processing applications, mapping applications, media player applications).

The illustrated mobile device 1600 can include memory 1620. Memory 1620 can include non-removable memory 1622 and/or removable memory 1624. The non-removable memory 1622 can include RAM, ROM, flash memory, a hard disk, or other well-known memory storage technologies. The removable memory 1624 can include flash memory or a Subscriber Identity Module (SIM) card, which is well known in GSM communication systems, or other well-known memory storage technologies, such as "smart cards." The memory 1620 can be used for storing data and/or code for running the operating system 1612 and the applications 1614. Example data can include web pages, text, images, sound files, video data, or other data sets to be sent to and/or received from one or more network servers or other devices via one or more wired or wireless networks. The memory 1620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1600 can support one or more input devices 1630, such as a touch screen 1632, microphone 1634, camera 1636, physical keyboard 1638 and/or trackball 1640 and one or more output devices 1650, such as a speaker 1652 and a display 1654. Touch screens, such as touch screen 1632, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1632 can support a finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches or between 0.75 inches and 1 inch, or between 1 inch and 1.5 inches, etc.

The mobile device 1600 can include point accuracy logic 1692. The point accuracy logic 1692 is configured to increase touch and/or hover accuracy on the mobile device 1600 in accordance with any one or more of the techniques described herein.

Other possible output devices (not shown) can include piezoelectric or other haptic output devices. Some devices can serve more than one input/output function. For example, touch screen 1632 and display 1654 can be combined in a single input/output device. The input devices 1630 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1612 or applications 1614 can comprise speech-recognition software as part of a voice control interface that allows a user to operate the device 1600 via voice commands. Further, the device 1600 can comprise input devices and software that allows for user interaction via a user's spatial gestures, such as detecting and interpreting gestures to provide input to a gaming application.

Wireless modem(s) 1660 can be coupled to antenna(s) (not shown) and can support two-way communications between the processor 1610 and external devices, as is well understood in the art. The modem(s) 1660 are shown generically and can include a cellular modem 1666 for communicating with the mobile communication network 1604 and/or other radio-based modems (e.g., Bluetooth 1664 and/or Wi-Fi 1662). At least one of the wireless modem(s) 1660 is typically configured for communication with one or more cellular networks, such as a GSM network for data and voice communications within a single cellular network, between cellular networks, or between the mobile device and a public switched telephone network (PSTN).

The mobile device can further include at least one input/output port 1680, a power supply 1682, a satellite navigation system receiver 1684, such as a Global Positioning System (GPS) receiver, an accelerometer 1686, and/or a physical connector 1690, which can be a USB port, IEEE 1394

(FireWire) port, and/or RS-232 port. The illustrated components 1602 are not required or all-inclusive, as any components can be deleted and other components can be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any one or more of components 1602, hover-enabled touch screen sensor 104, gesture engine 106, point accuracy logic 108, operating system logic 110, rendering engine 112, point accuracy logic 504, hover determination logic 506, location determination logic 508, distance determination logic 510, angle determination logic 512, point determination logic 514, approach determination logic 516, causation logic 518, window determination logic 520, element determination logic 522, point accuracy logic 704, hover determination logic 706, mapping logic 708, attribute changing logic 710, hand determination logic 712, initiation logic 1104, hover detection logic 1106, gesture logic 1108, action logic 1110, discontinuation logic 1112, motion logic 1502, time logic 1504, range logic 1506, value change logic 1508, flowchart 200, flowchart 300, flowchart 400, flowchart 600, flowchart 1000, flowchart 1200, flowchart 1300, and/or flowchart 1400 may be implemented in hardware, software, firmware, or any combination thereof.

For example, any one or more of components 1602, hover-enabled touch screen sensor 104, gesture engine 106, point accuracy logic 108, operating system logic 110, rendering engine 112, point accuracy logic 504, hover determination logic 506, location determination logic 508, distance determination logic 510, angle determination logic 512, point determination logic 514, approach determination logic 516, causation logic 518, window determination logic 520, element determination logic 522, point accuracy logic 704, hover determination logic 706, mapping logic 708, attribute changing logic 710, hand determination logic 712, initiation logic 1104, hover detection logic 1106, gesture logic 1108, action logic 1110, discontinuation logic 1112, motion logic 1502, time logic 1504, range logic 1506, value change logic 1508, flowchart 200, flowchart 300, flowchart 400, flowchart 600, flowchart 1000, flowchart 1200, flowchart 1300, and/or flowchart 1400 may be implemented as computer program code configured to be executed in one or more processors.

For clarity, only certain selected aspects of the software-based and firmware-based implementations are described. Other details that are well known in the art are omitted. For example, it should be understood that the disclosed technology is not limited to any specific computer language or program. For instance, the disclosed technology can be implemented by software and/or firmware written in C++, Java, Perl, JavaScript, Adobe Flash, or any other suitable programming language.

In another example, any one or more of components 1602, hover-enabled touch screen sensor 104, gesture engine 106, point accuracy logic 108, operating system logic 110, rendering engine 112, point accuracy logic 504, hover determination logic 506, location determination logic 508, distance determination logic 510, angle determination logic 512, point determination logic 514, approach determination logic 516, causation logic 518, window determination logic 520, element determination logic 522, point accuracy logic 704, hover determination logic 706, mapping logic 708, attribute changing logic 710, hand determination logic 712, initiation logic 1104, hover detection logic 1106, gesture logic 1108, action logic 1110, discontinuation logic 1112, motion logic 1502, time logic 1504, range logic 1506, value change logic 1508, flowchart 200, flowchart 300, flowchart 400, flowchart 600, flowchart 1000, flowchart 1200, flowchart 1300, and/or flowchart 1400 may be implemented as hardware logic/electrical circuitry.

For instance, in an embodiment, one or more of components 1602, hover-enabled touch screen sensor 104, gesture engine 106, point accuracy logic 108, operating system logic 110, rendering engine 112, point accuracy logic 504, hover determination logic 506, location determination logic 508, distance determination logic 510, angle determination logic 512, point determination logic 514, approach determination logic 516, causation logic 518, window determination logic 520, element determination logic 522, point accuracy logic 704, hover determination logic 706, mapping logic 708, attribute changing logic 710, hand determination logic 712, initiation logic 1104, hover detection logic 1106, gesture logic 1108, action logic 1110, discontinuation logic 1112, motion logic 1502, time logic 1504, range logic 1506, value change logic 1508, flowchart 200, flowchart 300, flowchart 400, flowchart 600, flowchart 1000, flowchart 1200, flowchart 1300, and/or flowchart 1400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 17:
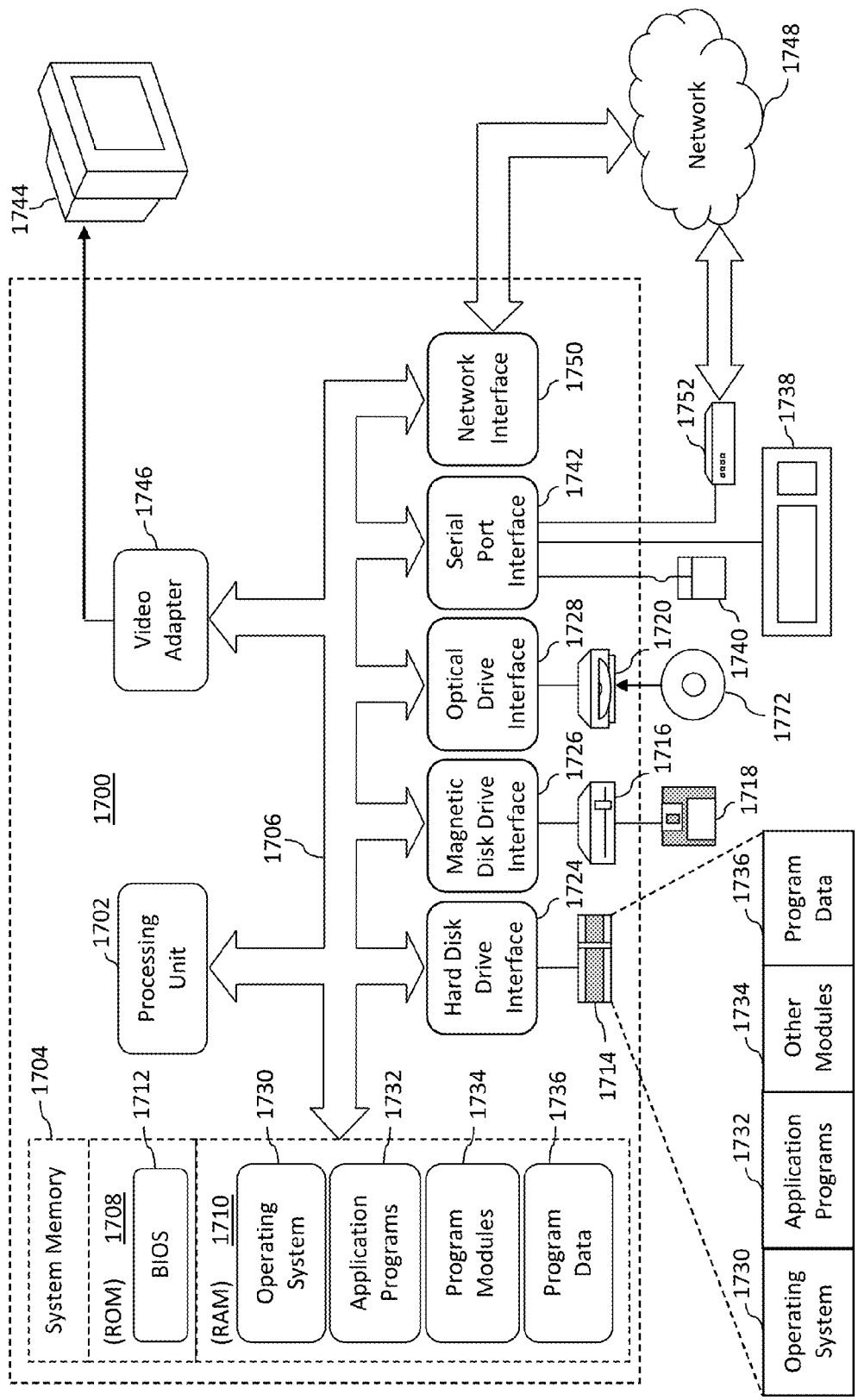
FIG. 17 depicts an example computer in which embodiments may be implemented.

FIG. 17 depicts an example computer 1700 in which embodiments may be implemented. For instance, any of touch-enabled devices 100, 500, 700, and 1100 shown in respective FIGS. 1, 5, 7, and 11 and mobile device 1600 shown in FIG. 16 may be implemented using computer 1700, including one or more features of computer 1700 and/or alternative features. Computer 1700 may be a general-purpose computing device in the form of a conventional personal computer, a mobile computer, or a workstation, for example, or computer 1700 may be a special purpose computing device. The description of computer 1700 provided herein is provided for purposes of illustration, and is not intended to be limiting. Embodiments may be implemented in further types of computer systems, as would be known to persons skilled in the relevant art(s).

As shown in FIG. 17, computer 1700 includes a processing unit 1702, a system memory 1704, and a bus 1706 that couples various system components including system memory 1704 to processing unit 1702. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computer 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1730, one or more application programs 1732, other program modules 1734, and program data 1736. Application programs 1732 or program modules 1734 may include, for example, computer program logic for implementing any one or more of components 1602, hover-enabled touch screen sensor 104, gesture engine 106, point accuracy logic 108, operating system logic 110, rendering engine 112, point accuracy logic 504, hover determination logic 506, location determination logic 508, distance determination logic 510, angle determination logic 512, point determination logic 514, approach determination logic 516, causation logic 518, window determination logic 520, element determination logic 522, point accuracy logic 704, hover determination logic 706, mapping logic 708, attribute changing logic 710, hand determination logic 712, initiation logic 1104, hover detection logic 1106, gesture logic 1108, action logic 1110, discontinuation logic 1112, motion logic 1502, time logic 1504, range logic 1506, value change logic 1508, flowchart 200 (including any step of flowchart 200), flowchart 300 (including any step of flowchart 300), flowchart 400 (including any step of flowchart 400), flowchart 600 (including any step of flowchart 600), flowchart 1000 (including any step of flowchart 1000), flowchart 1200 (including any step of flowchart 1200), flowchart 1300 (including any step of flowchart 1300), and/or flowchart 1400 (including any step of flowchart 1400), as described herein.

A user may enter commands and information into the computer 1700 through input devices such as keyboard 1738 and pointing device 1740. Other input devices (not shown) may include a microphone, joystick, game pad, satellite dish, scanner, touch screen, camera, accelerometer, gyroscope, or the like. These and other input devices are often connected to the processing unit 1702 through a serial port interface 1742 that is coupled to bus 1706, but may be connected by other interfaces, such as a parallel port, game port, or a universal serial bus (USB).

A display device 1744 (e.g., a monitor) is also connected to bus 1706 via an interface, such as a video adapter 1746. In addition to display device 1744, computer 1700 may include other peripheral output devices (not shown) such as speakers and printers.

Computer 1700 is connected to a network 1748 (e.g., the Internet) through a network interface or adapter 1750, a modem 1752, or other means for establishing communications over the network. Modem 1752, which may be internal or external, is connected to bus 1706 via serial port interface 1742.

As used herein, the terms "computer program medium" and "computer-readable storage medium" are used to generally refer to media such as the hard disk associated with hard disk drive 1714, removable magnetic disk 1718, removable optical disk 1722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1732 and other program modules 1734) may be stored on the hard disk, magnetic disk, optical disk, ROM, or RAM. Such computer programs may also be received via network interface 1750 or serial port interface 1742. Such computer programs, when executed or loaded by an application, enable computer 1700 to implement features of embodiments discussed herein. Accordingly, such computer programs represent controllers of the computer 1700.

Example embodiments are also directed to computer program products comprising software (e.g., computer-readable instructions) stored on any computer-useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A computer program product comprising a computer-readable medium having computer program logic recorded thereon for enabling a processor-based system to increase at least one of touch accuracy or hover accuracy on a touch-enabled device, the computer program logic comprising:
   a first program logic module for enabling the processor-based system to determine at least one finger in a hover position, the at least one finger being a spaced distance from a touch screen;

a second program logic module for enabling the processor-based system to determine a first location of the at least one finger in a plane that is parallel with the touch screen;

a third program logic module for enabling the processor-based system to determine a distance between the at least one finger and the touch screen, the distance being along an axis that is perpendicular to the touch screen;

a fourth program logic module for enabling the processor-based system to determine an angle of the at least one finger with respect to the axis;

a fifth program logic module for enabling the processor-based system to determine a second location on the touch screen to which the at least one finger points based on the first location, the distance, and the angle;

a sixth program logic module for enabling the processor-based system to determine whether a text window is displayed at the second location; and a seventh program logic module for enabling the processor-based system to cause text to be copied into the text window in response to the second location being determined.

2. The computer program product of claim 1, wherein the computer program logic further comprises:

an eighth program logic module for enabling the processor-based system to determine whether the at least one finger is approaching the touch screen; and wherein the fifth program logic module comprises:
logic for enabling the processor-based system to determine the second location in response to a determination that the at least one finger is approaching the touch screen.

3. The computer program product of claim 1, wherein the seventh program logic module comprises:

logic for enabling the processor-based system to cause a cursor to be displayed in the text window in response to the second location being determined.

4. The computer program product of claim 1, wherein the computer program logic further comprises:

an eighth program logic module for enabling the processor-based system to cause a visual characteristic of the text window to change based on the at least one finger pointing to the second location.

5. The computer program product of claim 1, wherein the second program logic module comprises:

logic for enabling the processor-based system to determine the first location of the at least one finger in the plane that is parallel with the touch screen based at least in part on a centroid of the at least one finger.

6. The computer program product of claim 1, wherein the computer program logic further comprises:

an eighth program logic module for enabling the processor-based system to determine that the at least one finger points to a plurality of third locations at a plurality of respective time instances as the at least one finger is moved across the touch screen, wherein a plurality of virtual elements is displayed at the plurality of respective third locations; and a ninth program logic module for enabling the processor-based system to cause an attribute of each of the plurality of virtual elements to change based at least in part on the at least one finger pointing to the third location at which the respective virtual element is displayed.

7. A method comprising:
detecting a hover gesture with regard to a virtual element on a touch screen based on a designated interaction between at least a portion of a hand and the touch screen,
the designated interaction being at least one of an electrical interaction, a magnetic interaction, or a light-based interaction,
a value corresponding to a distance between the hand and the touch screen being derived from a magnitude of a measurement of the designated interaction,
the hover gesture being a user command to perform an action associated with the virtual element,
the hover gesture occurring without the hand touching the touch screen; and
performing the action based on the hover gesture,
said detecting the hover gesture comprising:
determining that a plurality of fingers are moved together while the value equals a first value at a first time instance;
determining that the value increases from the first value to a second value during a first time period that follows the first time instance;
determining that the value decreases from the second value to a third value during a second time period that follows the first time period; and
determining that the plurality of fingers are moved apart at a second time instance that follows the second time period.

8. The method of claim 7, further comprising:
detecting one or more fingers in a hover position, the one or more fingers being a spaced distance from the touch screen; and
initiating a hover mode of operation in which detection of hover gestures is enabled based on an approach of the one or more fingers to the touch screen causing the value to be less than a threshold value.

9. The method of claim 8, further comprising:
discontinuing the hover mode of operation to disable detection of hover gestures based on a movement of the one or more fingers away from the touch screen causing the value to be greater than a second threshold value.

10. The method of claim 7, wherein determining that the plurality of fingers are moved together comprises:
determining that the plurality of fingers are moved together while the value equals the first value at the first time instance in response to the first value being less than a first threshold value;
wherein determining that the value increases from the first value to the second value comprises:
determining that the value increases from the first value to the second value in response to the second value being greater than a second threshold value;
wherein the method further comprises:
determining that the first period of time is less than or equal to a threshold time period; and
wherein performing the action comprises:
performing the action based at least in part on a determination that the first period of time is less than or equal to the threshold time period.

11. A system comprising:
at least one element including at least one of (a) one or more processors, (b) hardware logic, or (c) electrical circuitry,
the at least one element configured to determine at least one finger in a hover position, the at least one finger being a spaced distance from a touch screen, the at least one element configured to determine a first location of the at least one finger in a plane that is parallel with the touch screen, the at least one element configured to determine a distance between the at least one finger and the touch screen, the distance being along an axis that is perpendicular to the touch screen, the at least one element configured to determine an angle of the at least one finger with respect to the axis, the at least one element configured to determine a second location on the touch screen to which the at least one finger points based on the first location, the distance, and the angle, the at least one element configured to determine whether a text window is displayed at the second location, the at least one element configured to cause text to be copied into the text window in response to the second location being determined.

12. The system of claim 11, wherein the at least one element is configured to determine whether the at least one finger is approaching the touch screen; and wherein the at least one element is configured to determine the second location in response to a determination that the at least one finger is approaching the touch screen.

13. The system of claim 11, wherein the at least one element is configured to cause a cursor to be displayed in the text window in response to the second location being determined.

14. The system of claim 11, wherein the at least one element is configured to cause a visual characteristic of the text window to change based on the at least one finger pointing to the second location.

15. The system of claim 11, wherein the at least one element is configured to determine the first location of the at least one finger in the plane that is parallel with the touch screen based at least in part on a centroid of the at least one finger.

16. The system of claim 11, wherein the at least one element is configured to determine that the at least one finger points to a plurality of third locations at a plurality of respective time instances as the at least one finger is moved across the touch screen, wherein a plurality of virtual elements is displayed at the plurality of respective third locations; and wherein the at least one element is configured to cause an attribute of each of the plurality of virtual elements to change based at least in part on the at least one finger pointing to the third location at which the respective virtual element is displayed.

17. A system comprising:

at least one element including at least one of (a) one or more processors, (b) hardware logic, or (c) electrical circuitry, the at least one element configured to detect a hover gesture with regard to a virtual element on a touch screen based on a designated interaction between at least a portion of a hand and the touch screen, the hover gesture comprising:

movement of a plurality of fingers together while the value equals a first value at a first time instance, an increase of the value from the first value to a second value during a first time period that follows the first time instance, a decrease of the value from the second value to a third value during a second time period that follows the first time period, and movement of the plurality of fingers apart at a second time instance that follows the second time period, the designated interaction being at least one of an electrical interaction, a magnetic interaction, or a light-based interaction, a value corresponding to a distance between the hand and the touch screen being derived from a magnitude of a measurement of the designated interaction, the hover gesture being a user command to perform an action associated with the virtual element, the hover gesture occurring without the hand touching the touch screen, the at least one element configured to perform the action based on the hover gesture.

18. The system of claim 17, wherein the at least one element is configured to detect one or more fingers in a hover position, the one or more fingers being a spaced distance from the touch screen; and wherein the at least one element is configured to initiate a hover mode of operation in which detection of hover gestures is enabled based on an approach of the one or more fingers to the touch screen causing the value to be less than a threshold value.

19. The system of claim 18, wherein the at least one element is configured to discontinue the hover mode of operation to disable detection of hover gestures based on a movement of the one or more fingers away from the touch screen causing the value to be greater than a second threshold value.

20. The system of claim 17, wherein the at least one element is configured to determine that the plurality of fingers are moved together in response to the first value being less than a first threshold value;

wherein the at least one element is configured to determine that the value increases from the first value to the second value in response to the second value being greater than a second threshold value;

wherein the at least one element is configured to determine whether the first period of time is less than or equal to a threshold time period; and wherein the at least one element is configured to perform the action based at least in part on a determination that the first period of time is less than or equal to the threshold time period.

* * * * *